United States Patent
Pousti

(10) Patent No.: US 8,559,919 B2
(45) Date of Patent: Oct. 15, 2013

(54) SYSTEMS AND METHODS FOR GENERATION, REGISTRATION AND MOBILE PHONE BILLING OF A NETWORK-ENABLED APPLICATION WITH ONE-TIME OPT-IN

(75) Inventor: Michael Pousti, San Diego, CA (US)

(73) Assignee: SMS.ac, Inc., San Diego, CA (US)

( * ) Notice: Subject to any disclaimer, the term of this patent is extended or adjusted under 35 U.S.C. 154(b) by 0 days.

(21) Appl. No.: 13/611,324

(22) Filed: Sep. 12, 2012

(65) Prior Publication Data

US 2013/0006855 A1 Jan. 3, 2013

Related U.S. Application Data

(63) Continuation of application No. 13/367,145, filed on Feb. 6, 2012, now abandoned, which is a continuation of application No. 11/959,382, filed on Dec. 18, 2007, now abandoned, and a continuation-in-part of application No. 11/688,714, filed on Mar. 20, 2007, now abandoned, said application No. 11/959,382 is a continuation-in-part of application No. 11/688,584, filed on Mar. 20, 2007, now Pat. No. 7,826,421, which is a continuation-in-part of application No. 11/516,921, filed on Sep. 6, 2006, now Pat. No. 7,826,829.

(60) Provisional application No. 60/875,751, filed on Dec. 18, 2006, provisional application No. 60/784,393, filed on Mar. 20, 2006.

(51) Int. Cl.
*H04M 11/00* (2006.01)

(52) U.S. Cl.
USPC ........ 455/406; 455/408; 455/411; 455/414.1; 705/40; 705/14.39; 705/44; 705/52; 705/7.29

(58) Field of Classification Search
USPC .............. 455/3.01, 3.04, 3.06, 405, 406, 407, 455/408, 409, 410, 412.1, 412.2, 414.1, 455/414.2, 414.3, 414.4, 418, 419, 420, 455/456.3, 550.1, 556.2, 563, 566; 705/40, 705/7.29, 319, 10; 709/217, 206
See application file for complete search history.

(56) References Cited

U.S. PATENT DOCUMENTS

| | | | | |
|---|---|---|---|---|
| 6,075,982 A | * | 6/2000 | Donovan et al. | 455/406 |
| 7,242,676 B2 | * | 7/2007 | Rao et al. | 370/338 |
| 2002/0173977 A1 | * | 11/2002 | Dutta | 705/1 |
| 2005/0240432 A1 | * | 10/2005 | Jensen | 705/1 |
| 2006/0229896 A1 | * | 10/2006 | Rosen et al. | 705/1 |
| 2007/0106551 A1 | * | 5/2007 | McGucken | 705/10 |

* cited by examiner

*Primary Examiner* — Mahendra Patel
(74) *Attorney, Agent, or Firm* — Procopio, Cory, Hargreaves & Savitch LLP; Noel C. Gillespie

(57) ABSTRACT

A method of providing a service to a customer comprises receiving a request by a customer for an item of content, providing to the customer an option to subscribe to a service for a limited time, if the customer opts to subscribe, then providing the service for the limited time, and if the customer does not opt to subscribe, then not providing the service for the limited time.

20 Claims, 23 Drawing Sheets

Figure 8B

| | | | |
|---|---|---|---|
| Product URL: | http:// | | |
| Author Name: | | | |
| Pricing: | Tariff 26 | Pay out | |
| Number of Messages: | 1 | Sent per | Month |
| Adult (18+) Content | | Content guidelines ——— 822 | |
| Optional Fields: | | | |

| Field Name | Type | Value | Required | |
|---|---|---|---|---|
| Pizza | Text Field | Pizza | ✓ | |
| City | Drop Down List | New York; San Diego; Detroit | ✓ | ——— 824 |
| Team | Radio | Padres, Yankees, Tigers | ✓ | |
| | | | add more fields | |

Mobile Directory Category: Sports & Recreation
\
826

```
┌─────────────────────────────────────────────────┐
│                  ▓▓▓▓▓▓▓▓▓▓▓▓                   │
│ Revenue Calculator                              │
│ Understand the contents earnings of your messages│
│ Messages Sent (monthly) per use                 │
│ Sent (to      │ United States │ Carrier:       │
│ Country)      │               │                 │
│ Cingular Wireless                               │
│ Revenue per    Number of users   Cost per User per│
│ msg:                    ┌─────┐  Month:         │
│ 0.165                   │ 234 │  $013           │
│                         └─────┘                 │
│ Monthly Potential Revenue Share = $38.61        │
│                                      ▓▓▓▓▓▓▓▓▓▓ │
└─────────────────────────────────────────────────┘
```
\
828

*Mobile Products*       Available Products by this Developer       830
\

| | Product Name | Product Type | Description | Max | Pricing | Status | Manage |
|---|---|---|---|---|---|---|---|
| ☐ | funny mobile pod | Mobile Pod | This is the funniest pod ever!!! | 4 | 1 | Active | Edit |

Deactivate Selected Products

| Summary of Service | | 820 |
|---|---|---|
| | Mobile Facts | |
| Company | Black Evil | |
| Type | Mobile Alert | |
| Max Messages Daily | 4 | 872 |
| Pricing | $0.25 | 870 |
| Rating | No ratings | |
| Location | World Wide | |
| Language | United States | |
| Users | 2 | |
| Created | 8/11/2005 | |
| Your mobile phone will be charged. | | |

FIG. 8C

SYSTEMS AND METHODS FOR GENERATION, REGISTRATION AND MOBILE PHONE BILLING OF A NETWORK-ENABLED APPLICATION WITH ONE-TIME OPT-IN

RELATED APPLICATIONS INFORMATION

This present application claims the benefit of priority as a Continuation under 35 U.S.C. §120 of U.S. patent application Ser. No. 13/367,145, filed Feb. 6, 2012, entitled "Systems and Methods for Generation, Registration and Mobile Phone Billing of a Network-Enabled Application with One-Time Opt-In," which in turn claims the benefit of priority under 35 U.S.C. §120 of U.S. patent application Ser. No. 11/959,382, filed Dec. 18, 2007, entitled "Systems and Methods for Generation, Registration and Mobile Phone Billing of a Network-Enabled Application with One-Time Opt-In," which in turn claims the benefit of priority under 35 U.S.C. §119(e) of U.S. Provisional Application 60/875,751, filed Dec. 18, 2006, entitled "Method and System For One-Time Opt-In." U.S. patent application Ser. No. 11/959,382 also claims priority as a Continuation-In-Part (CIP) under 35 U.S.C. §120 of U.S. patent application Ser. No. 11/688,714, filed Mar. 20, 2007, entitled "Systems and Methods for Generation, Registration and Mobile Phone Billing of Music Pod System," which in turn claims the benefit under 35 U.S.C. §119(e) to U.S. Provisional Patent Application Ser. No. 60/784,393, filed Mar. 20, 2006, entitled "Generation of Music-Content Application and Music Store With Monetized Mobile Phone Billing" and as a CIP under 35 U.S.C. §120 to U.S. patent application Ser. No. 11/688,584 (now U.S. Pat. No. 7,826,421), filed on Mar. 20, 2007, entitled "Network-enabled application Integration With Automated Mobile Phone Billing and Distribution Platform," which in turn claims priority as a CIP to U.S. Pat. No. 11/516,921 (now U.S. Pat. No. 7,826,829), filed Sep. 6, 2006, entitled "Automated Billing and Distribution Platform for Application Providers." All of the above applications are incorporated herein by reference in their entirety as if set forth in full.

U.S. patent application Ser. No. 11/959,382 is also related to commonly-owned U.S. patent application No. 11/446,973 (now U.S. Pat. No. 8,073,774), filed Jun. 6, 2006, entitled "Billing Systems and Methods For Micro-Transactions," and U.S. Provisional Patent Application Ser. No. 60/784,393, filed Mar. 20, 2006, entitled "Generation of Music-Content Application Pod and Music Store with Monetized Mobile Phone Billing," both of which are incorporated by reference herein for all purposes.

BACKGROUND INFORMATION

1. Technical Field

The embodiments described herein relate to a dynamic community-based system which integrates network-enabled applications, or network-enabled applications with an automated distribution and billing platform in an environment which supports micro-transactions for mobile phone users, and more particularly to such a system that allows one-time opt-in for the network-enabled applications.

2. Related Art

While credit card use and automatic credit card billing is a common way to conduct business transactions in many countries, they are not necessarily the best way in some situations. In particular, there are many users of the internet that do not have access to a credit card. However, these users most likely have cellular telephone service. Also, use of a credit card is economically viable only if the transaction amount exceeds a particular amount that depends on the underlying efficiency of the billing and collecting system.

Currently, cellular telephone carriers (or mobile phone carriers, the terms are used interchangeably throughout this specification) routinely bill users for small transactional amounts and are able to do so while making a profit. These transactions are referred to as micro-transactions and, in terms of U.S. currency, can be as small as a few pennies (additionally, larger transactions occur as well). Retailers or vendors may desire to provide their respective content or services to mobile phone users via the web or directly through the user's mobile phone, and bill for such content or services as micro-transactions. Currently, a retailer or vendor will find it very difficult to take advantage of this opportunity for micro-transaction billing for their content or services accessed by a mobile phone user because doing so would require the retailer/vendor to personally negotiate and reach a contractual agreement with the particular cellular carrier to which the mobile phone user is subscribed. The process is further complicated by the fact that not all consumers use the same cellular carrier and, therefore, the retailer/vendor would need to contract with hundreds of different cellular carriers around the globe to be able to have this billing option available to the desired global market of mobile phone users.

Thus, there exists a need for a system and method that allows retailers to easily conduct transactions, many of which may be micro-transactions, with the global market of mobile phone users, where the transactions are easily billable to a wide variety of cellular carriers while eliminating the need for each retailer/vendor to individually contract with each of the wide variety of cellular carriers. In addition, it is desirable to provide a support system for retailers to develop network-enabled applications that are a dynamic and community-based for access and use by mobile phone users. Also, it is desirable to provide a method and/or system to allow a third party to offer their content and information, e.g., music-related content and information, for purchase and use by users of the community platform without requiring the third party to design, develop and implement a network-enabled application, whereby music content is paid for without requiring a user's credit card or financial information.

Moreover, the delivery of, e.g., music and video products and content to customers is marked by a competitive environment. One enticement offered to customers is to listen to or view a part of an item of content such as a song or video, at no charge, prior to actually purchasing it. This allows the customer to decide whether or not they like the content enough to purchase the same.

SUMMARY

Methods and systems are disclosed that allow customers to be given free trials of selected services or an offer to purchase selected services upon an indication that a customer is interested in such a service or similar services. The customer is first given an opportunity to preview, e.g., music or videos of interest by streaming, downloading, or via another transmission mechanism. The method and system can be generated when a verified customer attempts to add a video or song for the first time and offers them a free trial, e.g., for 30 days, of a pre-selected amount, or an unlimited amount, of videos, music, or a combination of both.

According to one aspect, the product can be accessed in private and public view.

According to another aspect, when the trial ends the customer can be automatically billed when they click, e.g., "Add Video," "Add Song," or "Continue." After completing One Time Opt-in the customer may never have to opt-in to video or music packages again. Essentially, the customer has preauthorized charges to a mobile phone account for services selected thereafter. Accordingly, the customer will not be interrupted in the future in order to authorize each individual purchase.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

Figure 2:
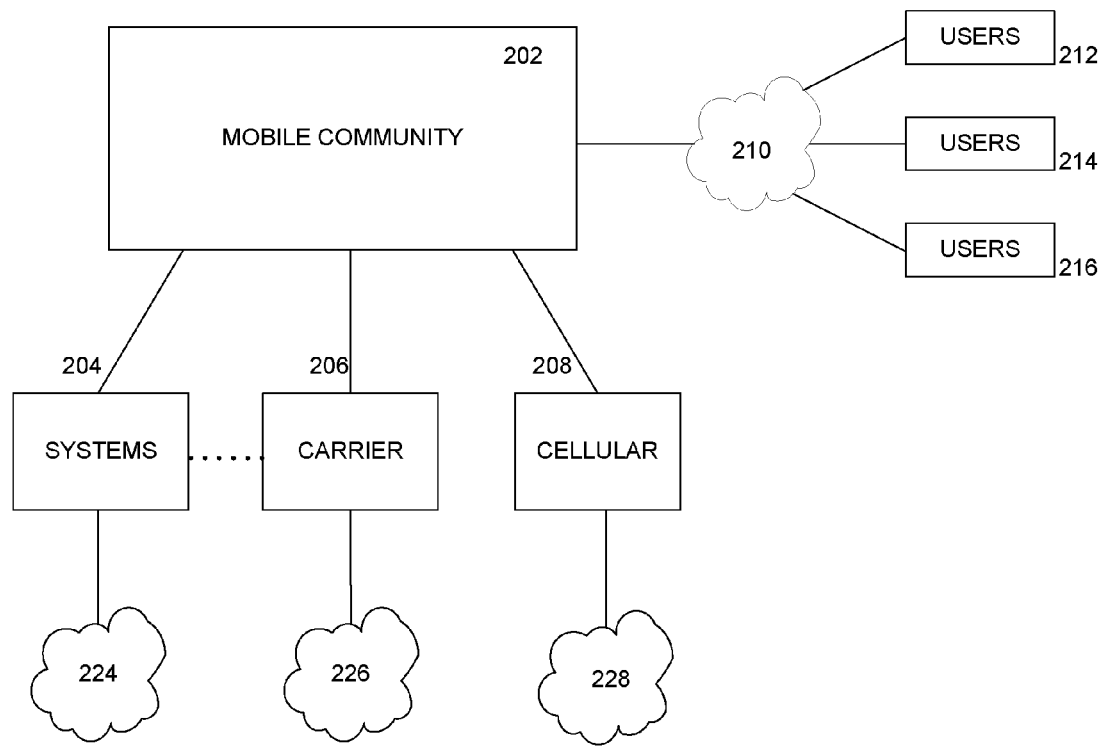
FIG. 2 is a block diagram that illustrated a computer-based mobile community in accordance with one embodiment.

FIG. 2 depicts a block diagram of a computer-based mobile community 202. Users 212, 214, 216 can connect to the mobile community 202 via a network or similar communications channel 210. Via the connection, a user, e.g., 212 can create a profile page or "home page" that they can personalize. This profile page can include various files and content that the user wants to share with other members of the mobile community 202.

The profile page can include a hierarchy of pages, some of which are for public view and some of which have restrictions on viewing. For example, the mobile community 202 can be logically organized into neighborhoods such as "friends," "family," "workplace," "dog owners," etc. Users 212, 214, and 216 can belong to these different neighborhoods and share different pages with the members of the different neighborhoods.

Additionally, this mobile community 202 can be configured to connect with various cellular carrier systems 204,206, and 208, each of which has an associated community of mobile phone subscribers, 224, 226 and 228. Users 212, 214, and 216 of the mobile community 202 can also be subscribers of various cellular carriers. In this way, users 212, 214, and 216 of the mobile community 202 not only have access through the computer-based platform 202 to other users' profile pages, they also have easy access to subscribers of the various cellular carrier systems 204, 206, and 208.

Thus, the mobile community platform 202 can already have contracted for services with the cellular carrier systems 204, 206, and 208. As is known, the cellular carrier systems 204, 206, and 208 are configured to provide messaging and premium message functionality. Such messages are sent via the cellular carrier's infrastructure to mobile subscribers and, internal to the cellular carrier's infrastructure, generates a billing event according to a particular tariff rate. In practice, when the mobile community 202 sends a message via a cellular carrier system, e.g., 204, it is billing the recipient of the message using the existing billing system of that cellular carrier. The billing event is often a micro-transaction. Thus, a user, e.g., 212 of the mobile community can conduct transactions with a vendor within the mobile community 202 and be billed for those transactions via their cellular service account. The vendor in the transaction need only communicate with the mobile community 202 regarding the transaction and does not require any affiliation or agreement with any cellular carrier.

Figure 3:
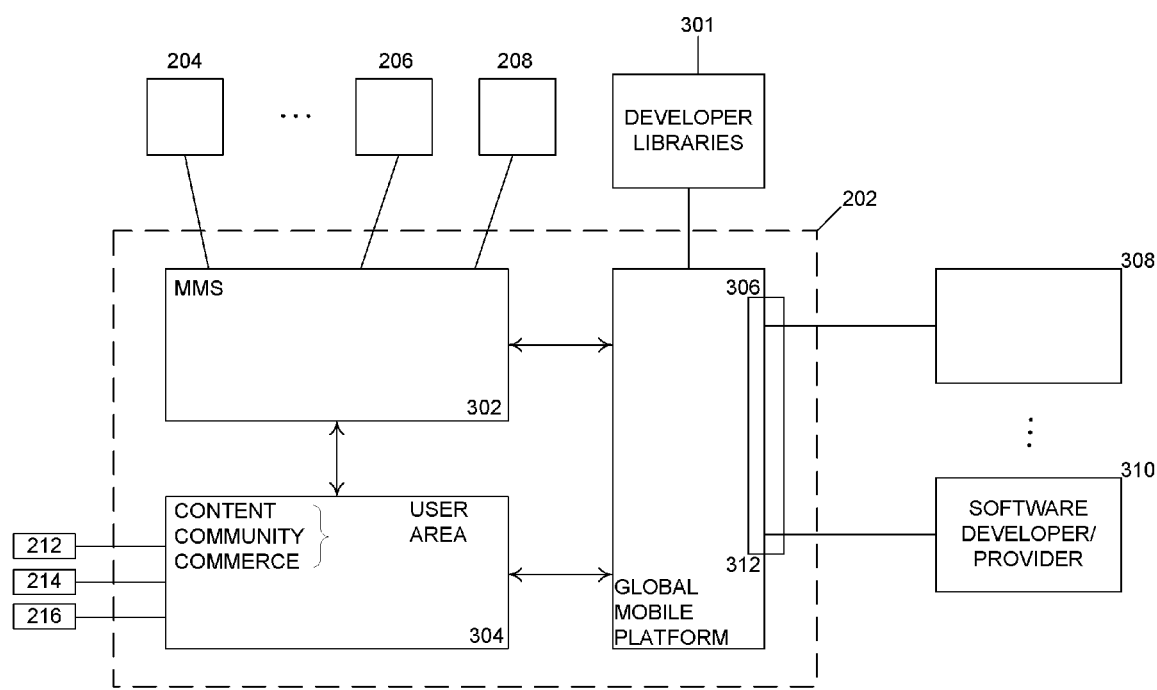
FIG. 3 is a block diagram that illustrates a more detailed view of the high-level system view of FIG. 2.

FIG. 3 depicts a more detailed view of the high-level system view of FIG. 2. In particular, the system of FIG. 3 can be used to conduct micro-transaction in which a cellular carrier's billing system is used by the mobile community 202 platform to automatically bill the user for each micro-transaction with a vendor/retailer, without the need for a negotiation or contract between the vendor and the cellular carrier. One example of this feature is that of software content distribution where software developers can offer software products to the users of the mobile community 202, while taking advantage of the billing arrangements already in place between the mobile community 202 and the cellular carriers 204, 206, and 208. Of course, a software application can provide other types of content or service to users of mobile community 202.

Some of the sub-components of the mobile community 202 can include a global mobile platform 306, the user area 304 where the content, community, and commerce functions are handled for the users, and a multimedia messaging system 302. The details of these different sub-components are more fully explained throughout the remainder of this detailed description.

As noted earlier, users 212, 214, and 216 can visit the user area 304 to participate in an on-line community that includes various content and commerce opportunities. This is typically accomplished via a user's web browser that can be hosted, e.g., on a laptop or desktop computer, or, in the alternative, even on the user's mobile device such as a PDA or mobile phone. Thus, the user area 304 can include a web server that communicates with users 212, 214, and 216, and a data store of user information and other content. With these resources, the mobile community 202 can present to a user 212 a profile page ("home page") that reflects content and information associated with, and desired by, that particular user. This content and information is not maintained on the local computer being used by the user 212 but, rather, is maintained and managed by the computer systems within the user area 304.

Although not explicitly depicted in FIG. 3, it will be understood that there are numerous functionally equivalent techniques to create, manage, store and serve user information, user profiles, user content, software tools and other resources within the user area 304. Methods to ensure security, data integrity, data availability, and quality of service metrics can be included in these techniques.

The multimedia messaging system (MMS) 302 can include applications for connecting with and communicating with the multiple different cellular carriers 204, 206, and 208 that have been partnered with the platform of mobile community 202. The MMS 302 can be configured to generate message requests in the appropriate format for each of the cellular carriers 204, 206, and 208 including tariff information that determines the amount for which the recipient of the message will be charged. Upon receipt of the message request, the cellular carriers 204, 206, and 208 can use the information in the request to generate an appropriate message to the intended recipient/subscriber of the cellular carrier and then bill the recipient/subscriber's cellular service account for the specified amount.

The MMS 302 can communicate with the user area 304, such that users of the mobile community 202 can advantageously use the connectivity of the MMS 302 with the carriers in order to send messages to subscribers of any of the cellular carriers 204, 206, and 208. The messages can be SMS messages, MMS messages, or other message formats that are subsequently developed. Some of these messages can have zero tariff and, therefore do not generate a bill, other than the underlying charges implemented by the cellular carrier and others can have non-zero tariffs resulting in a billing event for the recipient.

The global mobile platform 306 can provide a link between software developers/providers 308 and 310 and the mobile community 202. In particular, using an interface 312, described in more detail below, a software providers 308 and 310 may offer services and products to users 212, 214, and 216. Advantageously for the software providers 308 and 310, the global mobile platform 306 also provides automatic and instant connectivity to the MMS 302 and the cellular carriers 204, 206, and 208. Accordingly, the software providers 308 and 310 can interact with all users of the mobile community 202 whereby billable transactions with users 212, 214, and 216 can be automatically billed via the billing systems of the cellular carriers 204, 206, and 208. Furthermore, this capability can be available to the software providers 308 and 310 without requiring the software providers 308 and 310 to negotiate or contract with any cellular carrier for billing arrangements, or to worry about how to communicate with a cellular carrier's systems and resources.

Thus, such a software provider can seamlessly takes advantage of the unified set of connectivity and billing arrangements that exist between the mobile community 202 and the cellular carriers 204, 206, and 208. Accordingly, in addition to the contractual arrangements and affiliations the mobile community 202 has in place with different carriers 204, 206, and 208, the underlying technical and communications infrastructure is also in place to communicate with and interoperate with each of the different carriers 204,206, and 208. As a result, vendors and other members of the mobile community can interface with and operate with any of a variety of different carriers without difficulty.

While some software applications that can be available to users 212, 214, and 216 can be hosted in the user area 304, the global mobile platform 306, or elsewhere in the community 202, it is often the case that the software developer/providers 308 and 310 will host their own software application at their own remote location. Accordingly, in the description that follows, even if remotely-hosted software is being discussed in a specific example, it will be appreciate that a software application being hosted differently is also expressly contemplated.

Figure 4:
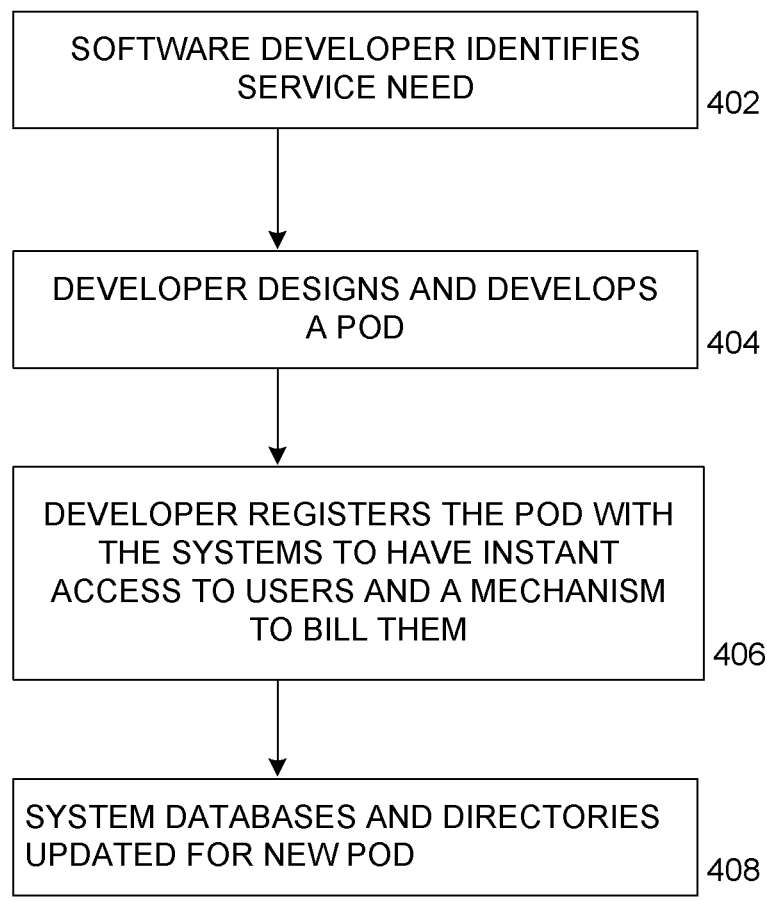
FIG. 4 is a flowchart illustrating an example method for distributing software via the mobile community architecture of FIG. 2.

FIG. 4 depicts a flowchart of an exemplary method for distributing software via the mobile community architecture of FIG. 2. In a first step 402, a software developer identifies a marketplace need that is not being fulfilled. In other words, the software developers believe that there is a service or product that they can provide that will be profitable. The variety of different types of services, content, and products that can be offered to users via a software application is limited only by the imagination of the different software developers.

The terms "pod service," "pod application," "widget," and network-enabled application are used in the following description as a label for software applications offered through the mobile community 202. These labels are used merely for convenience and are not intend to limit or restrict the types, variety and capabilities of potential software applications that can be accessed and delivered through platform 202 in any way. As used herein, the term "pod" refers both to a the underlying information related to the pod application and to the graphical rendering of the pod application on a user's profile page within the mobile community 202.

Once the marketplace is identified, the developer commences development of their software application in step 404. The underlying application logic can be up to the developer and can utilize any of the widely known programming environments and techniques available; however, the software application can be offered within the mobile community 202 along with a variety of other software applications. Accordingly, standardizing the look and feel of the application and information about the application can aid the users 212, 214, and 216 and make their community experience more enjoyable.

Once a pod application has been developed, and most likely tested and verified, by a developer, the developer can register, in step 406, the pod application with the global mobile platform 306. Registering the pod application, which is described in more detail later with reference to a number of screenshots, can allow the software developer to inform the global mobile platform 306 that a new pod application is available for the access by mobile community 202.

Once a pod application is registered, the global mobile platform 306 can update, in step 408, system databases and directories for the new pod application and its associated information. In the above description of FIG. 4, it is evident that the pod developer communicates with the mobile community 202 for a number of different reasons. One of ordinary skill will recognize that these various communications between the pod developer and the mobile community 202 can occur via any of a variety of functionally equivalent means. For example, both wired and wireless communication means for these communications are explicitly contemplated.

Figure 5:
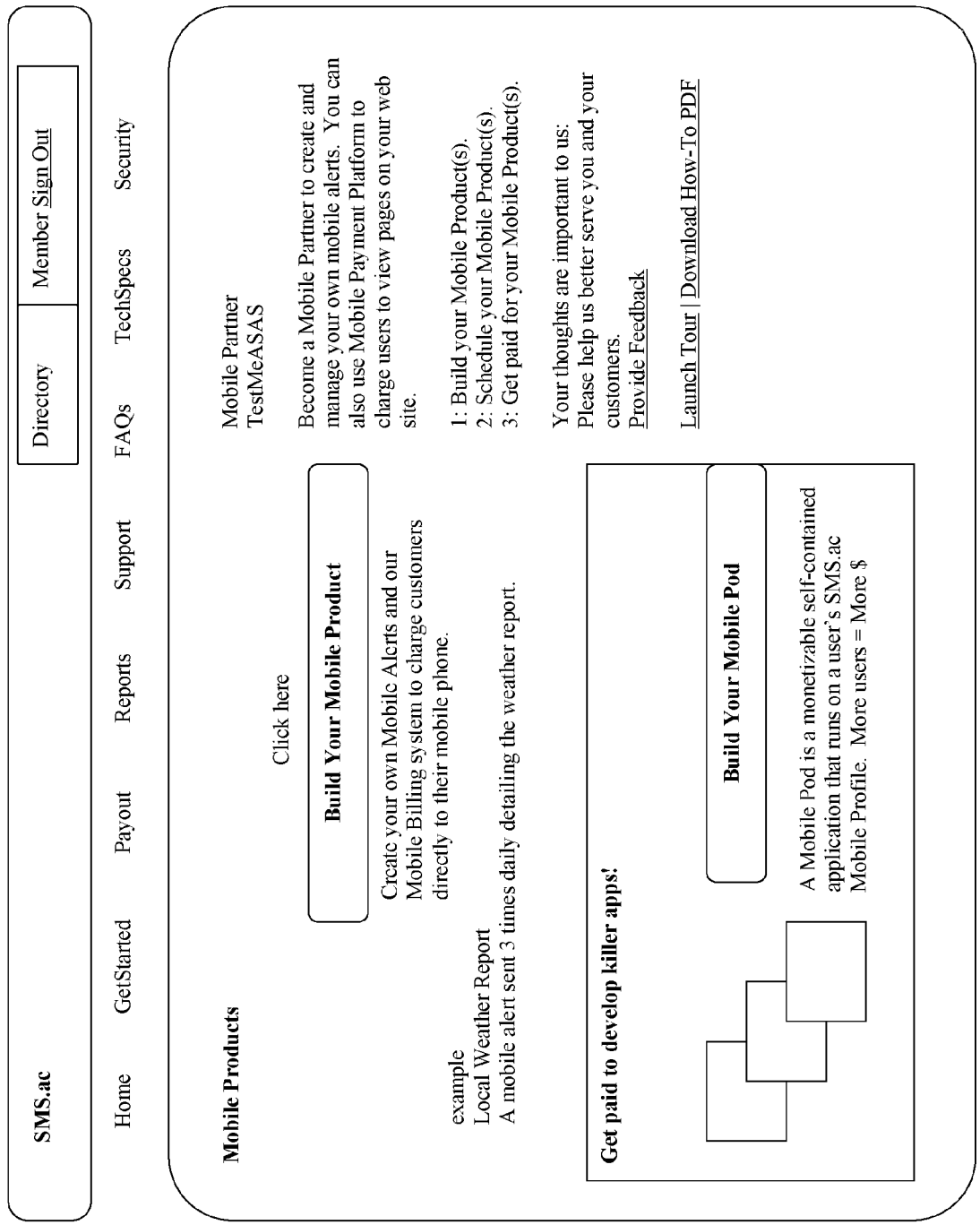
FIGS. 5-8 are screenshots illustrating example windows that software developers may be presented to assist in registering a new pod with the mobile community architecture of FIG. 2.
Figure 6:
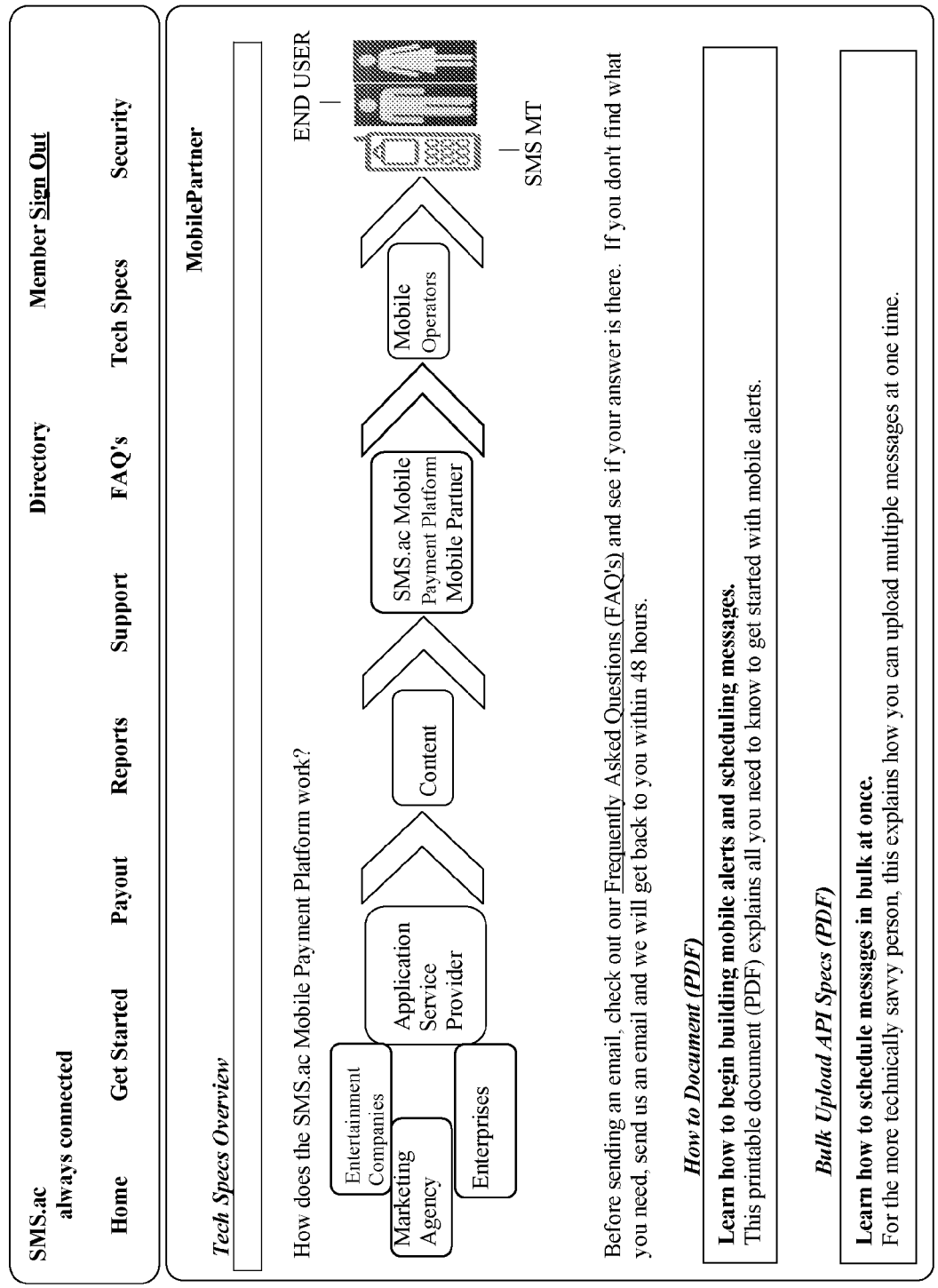

FIG. 5 is a screenshot of an exemplary window that software developers can be presented to assist in registering a new pod. From this screen, the software developer can navigate to a screen that provides more technical information such as the one shown in FIG. 6. This screen illustrates to the developer how the pod application takes advantage of the existing mobile payment platform when used by an end user.

Figure 7:
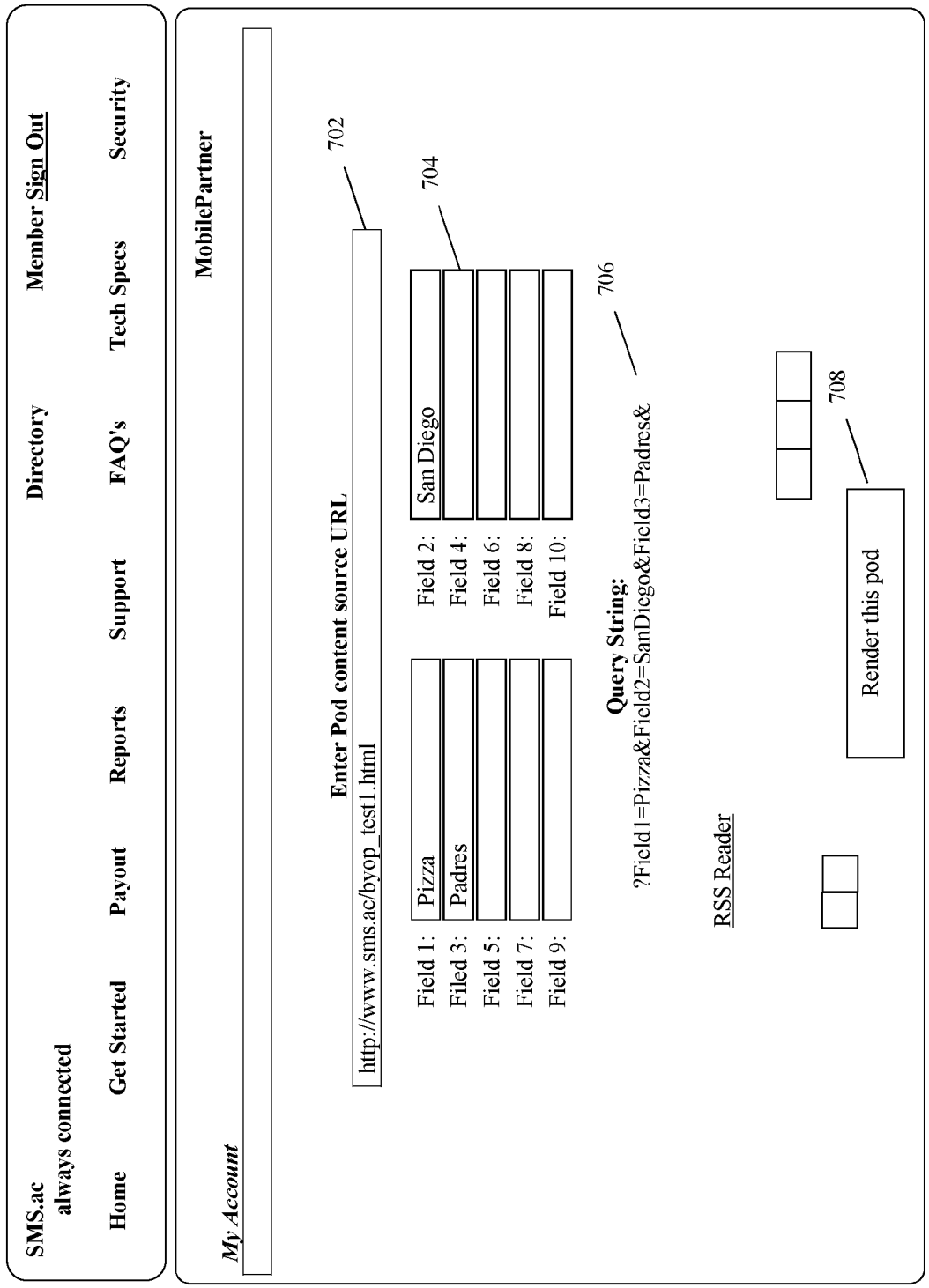

FIG. 7 is a screenshot of an exemplary pod registration screen. Because the pod application is most likely hosted remotely, an input window 702 allows the pod developer to provide the URL of where the pod application is located. When a user ultimately uses the pod within the community 202, this URL is the location from where the content for the pod application is retrieved. For example, if the pod application was developed to display pictures for a dating service, this URL would point to code that when executed could detect user input events and result in the display of appropriate images.

The pod developer can utilize the field input boxes 704 to specify different fields that can capture input when a user first accesses a pod. For example, if a pod application is developed to provide stock quotes, then these fields could be defined to accept stock symbols. When the user views the pod within their profile page, these fields can be filled in with appropriate stock symbols, for example. When the user then selects a "submit" button, this information is sent to the pod application which returns the appropriate information.

As is well known to HTML and HTTP developers, based on the information that is filled in the field windows 704, a particular query string will be appended to a request received from a user's form submission. To aid a developer in registering a pod, this query string can be automatically generated and displayed for the pod developer in region 706 of the exemplary screen. To give the pod developer a quick view of how the pod will be rendered, a button 708 can be provided to illustrate the pod. With this information, the developer may choose to revise their design.

Figure 8A:
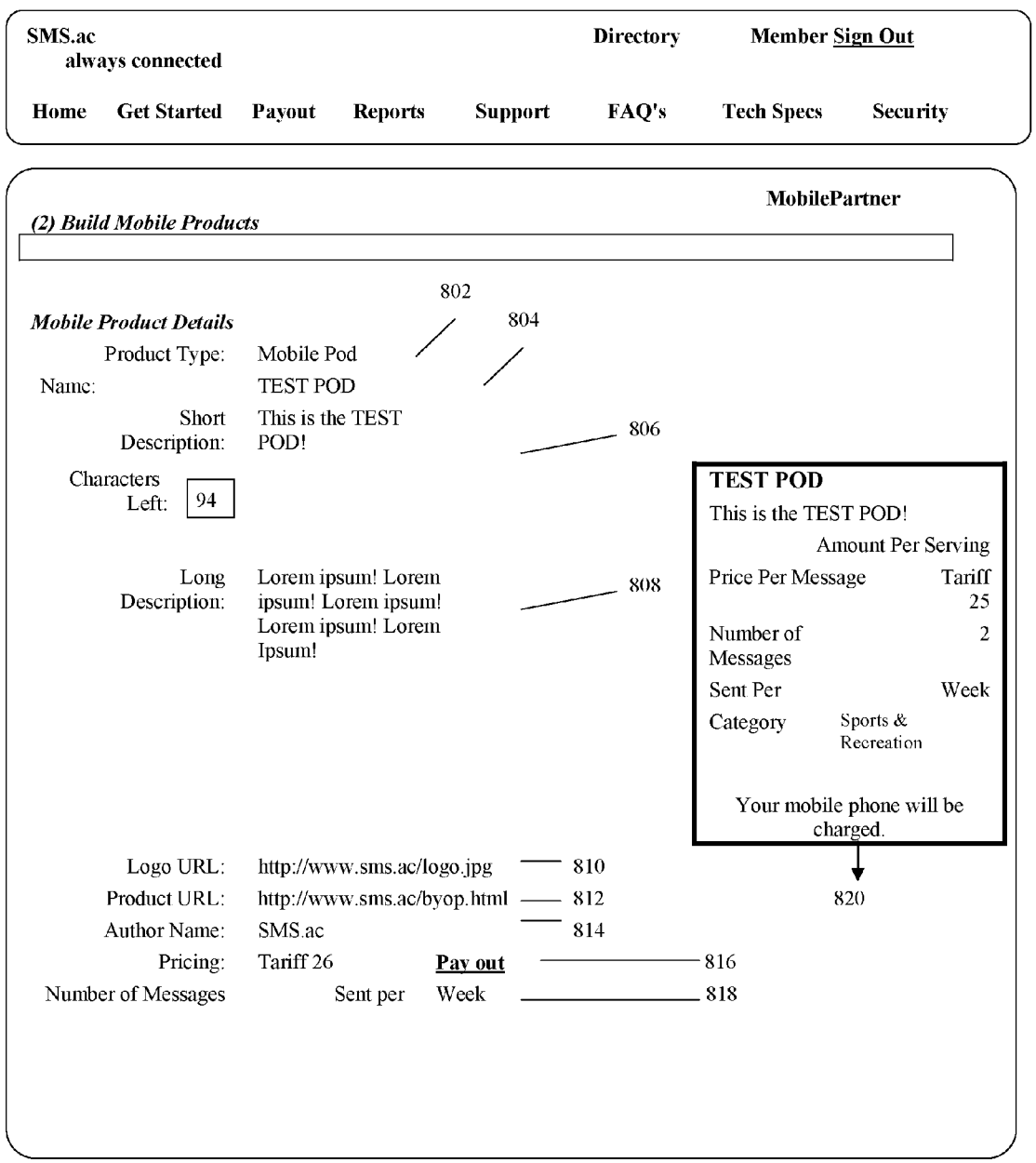

Once this initial information is collected, the global mobile platform 306 can collect additional information that can be associated with the pod. For example, in FIGS. 8A and 8B, a number of input fields 802-830 can be provided for the pod developer to fill in while registering their pod application. Many of these fields are self-explanatory; however, some warrant a more detailed discussion. In particular, a pricing window 816 can be available for the developer to select an appropriate pricing scheme according to a standardized pricing structure. According to one embodiment, pricing occurs in fixed tariff bands. For example, one band would be a $0.25 band and would be used for products or services that the developer thinks users would purchase for around $0.25. Another band may be $1.00 and would be for higher priced items and still other bands can be used as well. According to this arrangement, not all prices are available to the developer; instead, the developer picks the closest band to use, e.g., the $1.00 band is selected even if market research shows users would actually pay $1.03 for the service.

Additionally, the pod application will likely be used by people in different countries. Because of the vagaries of global economics, $0.25 may be too high of a price-point in many countries. Thus, it is more appropriate to set a price-point for each separate country from which the pod application may be used. While it is possible for the global mobile platform 306 to permit the pod developer to set such a vast number of price-points, most developers will not have the knowledge or the patience to perform such a task. Accordingly, the global mobile platform 306 can automatically provide a price band selection for each country based on their respective costs of living. In other words, a developer can select a price band in the currency that he is comfortable with and let the global mobile platform 306 translate that to an equivalent price band in each country.

Via the input field 818, the developer can also specify the number of messages and frequency that their pod application will send to each user. Based on their knowledge of having developed the pod application to perform a particular service, the pod developer may, for example, know that no more than 4 messages per day (per user) will be sent from their pod application. This information can be used to set the terms and conditions for billing the user. Thus, they would fill in this field 818 accordingly. As explained later, the global mobile platform 306 can use this information to control message traffic within the community 202.

By specifying the pricing information and number of message information, the terms and conditions of the pod application can be provided to a user in a uniform manner. Window 820, for example, displays for the pod developer how the pod application information, including pricing, terms, and conditions, will be shown to a user. FIG. 8C depicts a more detailed view of this uniform pricing display. Much like nutritional labels on food products provide a uniform format for presenting nutritional information, the format depicted in window 820 can be used to uniformly present information about pod applications. Thus, a user of the community 202 does not have to learn and interpret different pricing information for each different pod developer. Instead, the uniform format 820 simplifies understanding this information.

The exemplary format of window 820 can include a variety of information about the pod application. Of particular interest to most users is the uniform manner in which the pricing information 870 and the message information 872 is clearly presented. It will be appreciated that the format of window 820 is merely exemplary in nature and can vary in numerous ways. Accordingly, the exemplary format of window 820 is provided to illustrate that the global mobile platform 306 can be arranged so as to provide users of the community 202 with uniformly formatted information from a variety of different pod applications so as to simplify the evaluation and comparison of different offerings. With such a uniform pricing arrangement being used, it becomes possible to monitor the behavior of pod developers with respect to their specified pricing structure and implement control measures such as limiting or restricting their activities within the mobile community 202 if warranted.

Once the information of screens 8A and 8B are submitted to the global mobile platform 306, the pod application can be registered with the mobile community 202. According to at least one embodiment, the pod application can be evaluated by a moderator of the mobile community 202 to ensure it is acceptable from a technical and content point of view for the community 202. In this scenario, the pod application is not registered until the evaluation is completed satisfactorily.

Information about a registered pod application can be stored within the global mobile platform 306 in such a way that when a user wants to include a pod on their profile page, the pod can be rendered using the stored information and interaction between the pod and user can occur based on the stored information as well. In such a case, the data associated with the user can be updated to reflect that the user is now accessing and using the pod.

Thus, according to the previously described technique, a pod developer can automatically register a new pod application, even from a remote location, without difficulty in such a way that the pod automatically becomes available to users of the mobile community 202 at the conclusion of the registration process. Furthermore, from the pod developer's point of view, the pod application can immediately take advantage of the billing platform used by the mobile community 202 without the need to have existing contracts in place with one or more cellular carriers.

By registering pod applications in this manner, the global mobile manager 306 can prevent the terms and condition information from being changed by the pod developer once the pod is registered. Thus, a user's agreed upon price and operating parameters will not be modified, with or without their knowledge.

The users of the global community 202 can locate available pod applications in a number of different ways. First, the community 202 can facilitate sharing of information by people having common tastes. Accordingly, within the community 202 users frequently visit other users profile pages looking for interesting content and information, particularly with neighborhoods to which the user belongs. During this visiting of other members' home pages, a user can discover an interesting pod and want to get it for themselves. In terms of the community, a user "owns" their own profile page and is called an "owner" when at their profile page. In contrast, when a user visits some else's profile page, they are considered a "viewer". Within the mobile community 202, the profile pages are maintained such that the view by an owner may not always correspond to that seen by a viewer as the owner may want some information to be private and other information to be public.

In another instance, a user may know a friend or colleague would want a particular pod application; thus, the community 202 can allow a user to inform another user about the existence of a new pod application. Another way in which pod applications can be located is via a directory within the mobile community 202. For example, the global mobile platform 306 can register each pod application as the developers submit them; it is a simple extension to include a database update and a searchable-directory update as part of the registration process (see step 408 of FIG. 4).

Figure 9:
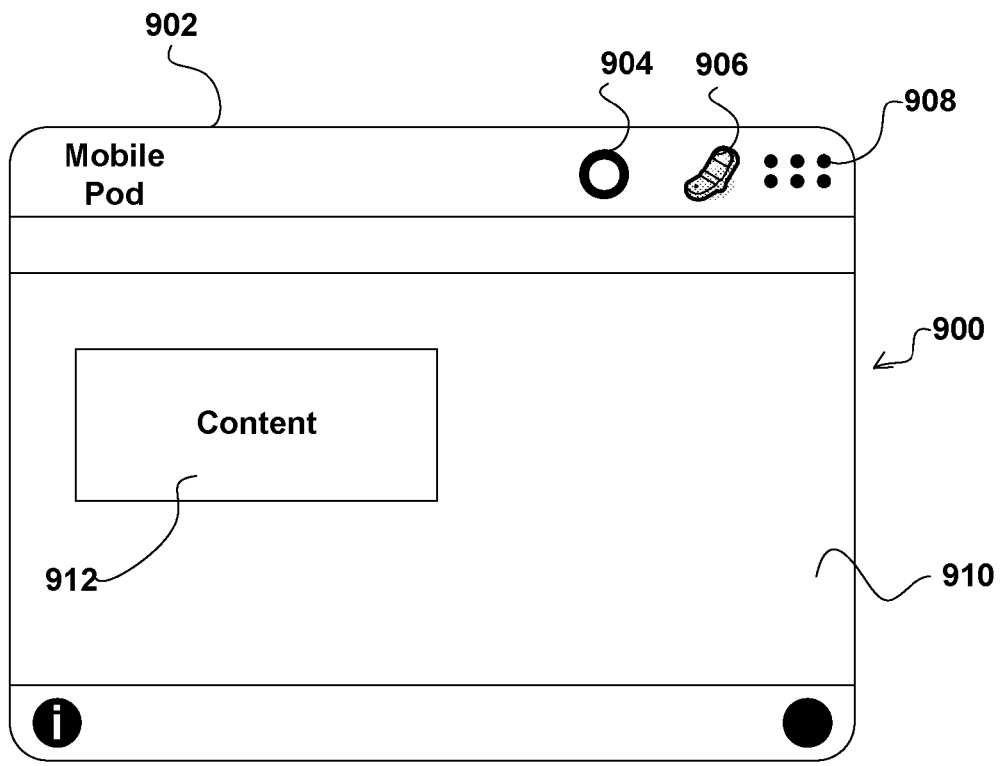
FIG. 9 is a diagram illustrating an example pod that can be developed and registered using the process depicted in screenshots 5-8.

A rendering of an exemplary pod 900 is depicted in FIG. 9. In this example, the pod includes a title bar 902 with a number of icons 904-908. The main window 910 of the pod is where the content 912 is displayed. This content can be based on the associated pod application and the stored system information associated with this pod. From the pod 900, a user can launch an initial message to the associated pod application. In instances where the pod application provides content back to the pod 900, the window 910 is updated. By using, e.g., remote scripting capability, the updating of window 910 can occur without the user manually refreshing the window 910. Similar to the profile pages described earlier, the pod 900 can be designed to provide different views of content 912 to a user depending on whether the user is an "owner" or a "viewer."

The icon 904 can be selected by a user, for example, when viewing someone else's pod, to add that pod to their own profile page. The icon 906 can be selected to inform another user about this pod and a drag icon 908 can be used to move the pod around a user interface screen. The "information" icon 914 is useful for displaying information about the pod, including the uniform pricing information described earlier.

Figure 10:
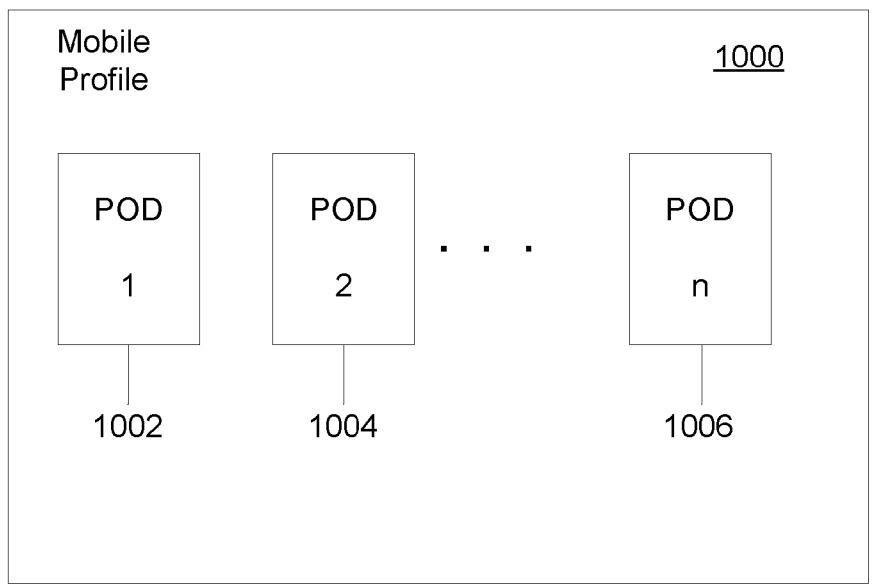
FIG. 10 is a diagram illustrating an example user profile page that can include pods, such as the pod of FIG. 9, and can be hosted by the mobile community architecture of FIG. 2.

FIG. 10 depicts a exemplary user profile page 1000 that can have arranged thereon a plurality of pods 1002, 1004, and 1006. In this manner, the pods available to a user can be displayed on their profile page. As noted earlier, the user can access this profile page via a number of different devices. For example, in addition to use of a traditional web browser, a portable device such as a smart phone or PDA can be used to access the profile page and pods. Such portable devices can utilize traditional WAP-based or HTML-based techniques to access the pods but they can also utilize device-based applications with proprietary protocols specifically developed to advantageously utilize the capabilities provided by pods and pod applications. Other example techniques implemented by portable devices that can be configured to access a profile page described herein include BREW, J2ME, etc.

Figure 11:
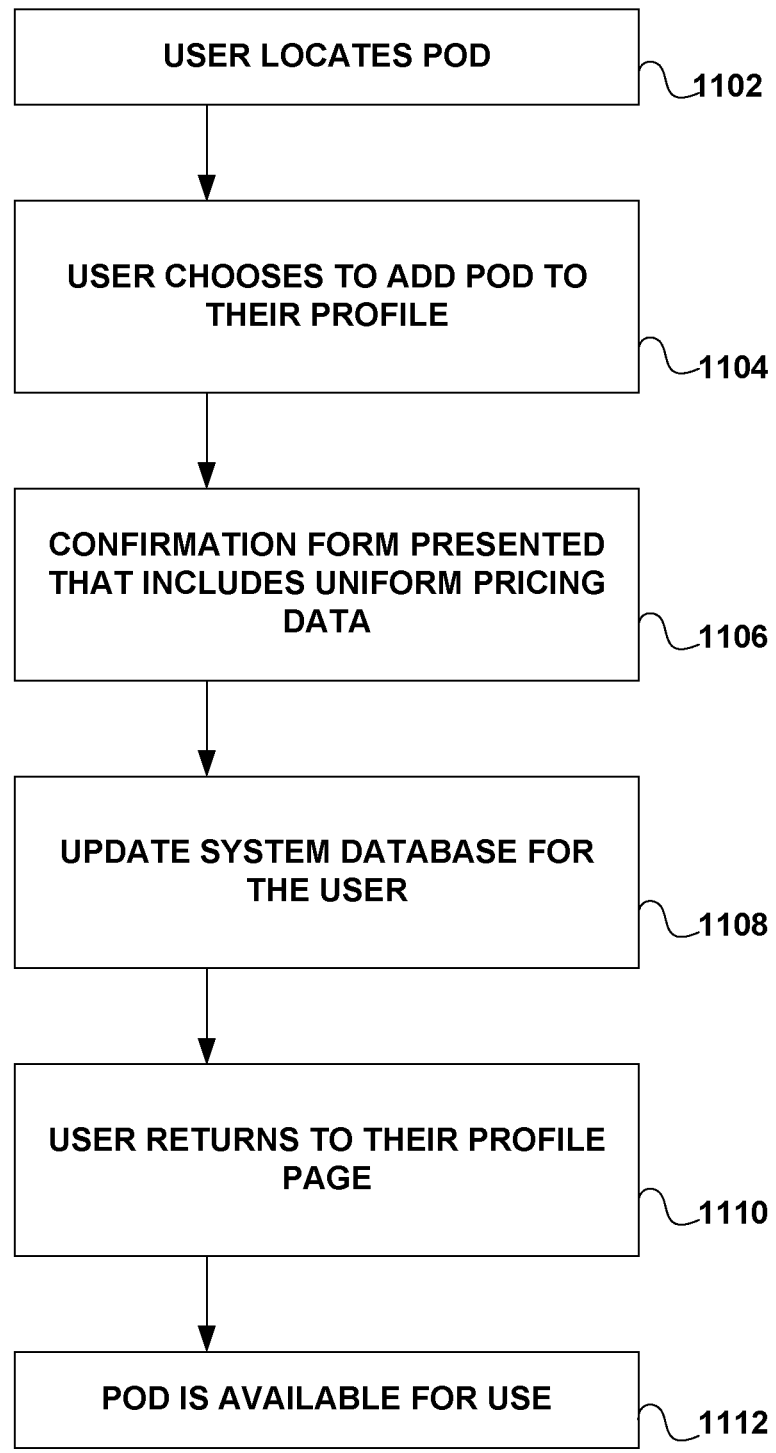
FIG. 11 is a flowchart illustrating an example method for a user to add a pod to their profile page.

FIG. 11 illustrates a flowchart of an exemplary method for a user to add a pod to their profile page. In step 1102, the pod user locates an interesting pod via a visit to another user's profile page or through a directory search. In evaluating the pod, the user can see the terms and conditions of the pod in the uniform presentation format described earlier. Next, in step 1104, the user can choose to add the pod to their profile page; typically using a standardized feature on the pod. In step 1106, a confirmation page can be sent to the user to ensure they know the pricing information about the pod and to ensure they are aware of the likelihood of their cellular service account being billed as a result of executing the pod application. Assuming the user confirms their selection, the user area 304 updates, in step 1108, its data store about this user such that the records indicate the user owns this new pod on their profile page. When the user next visits their profile page, in step 1110, and as a result of the user area 304 rendering their profile page on their browser, the new pod can be displayed. With the pod displayed within the profile page, it is now available for use by the user, in step 1112.

Figure 12:
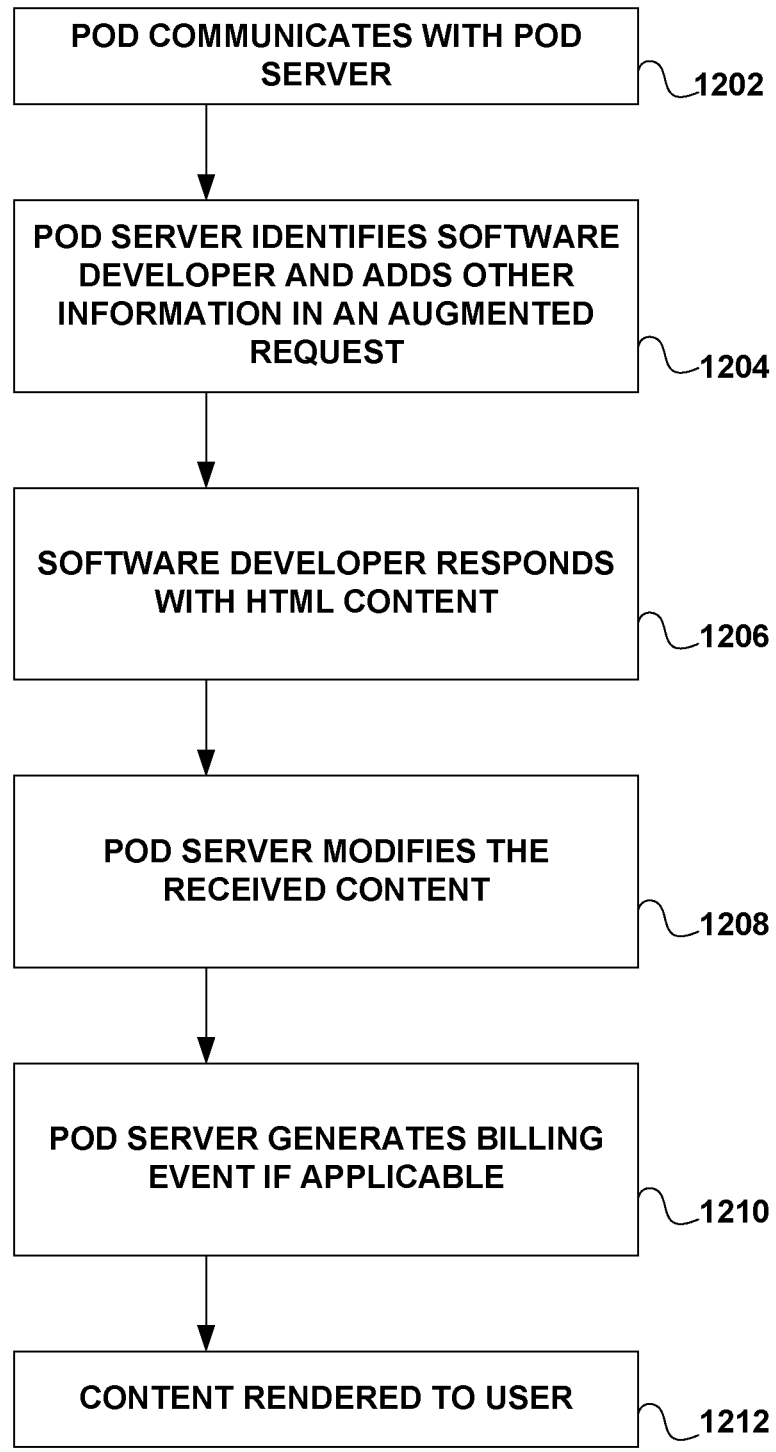
FIGS. 12 and 13 are flowcharts illustrating the operation of a pod and its associated pod application within the mobile community of FIG. 2.
Figure 13:
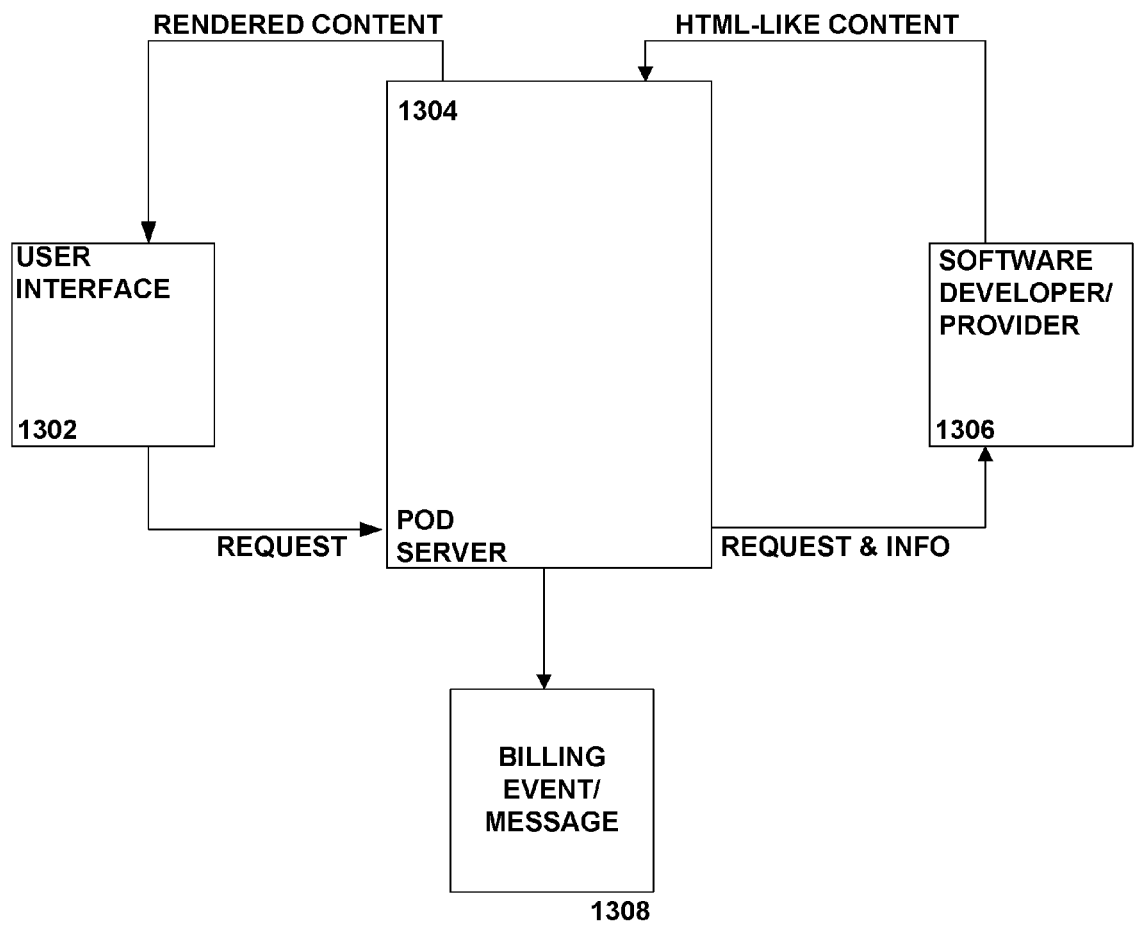

FIGS. 12 and 13 illustrate the operation of a pod and its associated pod application within the mobile community 202. The pod server 1304 can be a process executing on a separate, dedicated processor or can be included as part of the user area 304 or the global mobile platform 306. In step 1202, a user can interact with some feature on the pod user interface 1302 to generate a request. This request can include the URL associated with the content of the pod and a query string, if any, based on the fields of the pod, and information input by the user. The query string can sometime be referred to as transient parameters.

In response to the request from the pod user interface 1302, the pod server 1304 can identify the pod developer and the URL of the content and add some additional information, in step 1204. The augmented request can be sent to the software provider's application 1306, which responds, in step 1204, to the augmented request.

The information added to the augmented request can include demographic information about the owner and viewer of the pod. In this way, the software application 1306 can respond with a first type of content if the owner and viewer are the same or respond with different content if the owner and viewer are different. One way to accomplish this distinction is for the user area 304 to refer to users by a unique user ill number. Thus, users can be distinguished without revealing sensitive information to a software developer such as the mobile telephone number of a user. Also, the software application 1306 can use this demographic information to collect statistics about its users.

Other additional information that might be added would include details about the type of user interface the user has available. Because users may be using their mobile device, their display may not be as robust as a desktop interface. Thus, a software application 1306 can control content based on the current graphical and bandwidth capabilities of the user. For example, the additional information can indicate whether the user is operating in a web-based or mobile-based environment, e.g., a WAP, BREW, J2ME, etc., based environment.

In response to the augmented request, the software application 1306 responds with code, in step 1206, that is substantially HTML data. This code can be generated according to the application logic of the pod application 1306. In other words, it is the content that is returned to the user who is viewing the pod. In certain embodiments, the code of the response varies from conventional HTML in certain ways. For example, because this is a managed communication system, non-standard HTML tags can be used and supported. Thus, non-standard tags can be used that are specific to the pod environment that are not applicable to generic HTML pages. For example, a pod can have a title area and a message area. Tags specifically for controlling these areas can be used to add functionality to the pod environment described herein. It will be recognized that a number of different specialized tags and capabilities can be offered.

An additional variation from HTML is that of using templates where information can be provided by the pod server 1304. For example, depending on the embodiment, little identifying information is sent to the software application 1306 for privacy reasons. However, the pod server 1304 can have access to this information because it communicates with the user information stored in the user area 304. Thus, the use of templates will allow software applications 1306 to take advantage of this information to personalize the pod experience. For example, the template can include a tag <! FirstName !>. When the pod server 1304 encounters this tag in the template, it knows that the software application 1306 intends for the pod server to insert the first name of the user. A more detailed list of exemplary template tags is provided in the previously mentioned incorporated documents.

When the pod server 1304 receives the HTML-like reply from the software application 1306, the pod server can manipulate the reply into a format useful for the pod environment. For example, certain HTML features such as, for example, javascript, iframe, frame, and script features, can be removed from the reply in order to improve the security of the content. Secondly, the pod server 1304 can replace the personalizable parameters in the templates with the actual user information. And thirdly, the pod server 1304 can translate the content into other display formats, depending on the operating environment of the user, e.g., mobile or computer.

For example, if a software provider is well-skilled in providing WAP code as opposed to conventional HTML code, then that provider can control which code, or content, is generated based on the information it knows about the user's interface. However, if a software provider is not skilled with, or does not support, generating content in different formats, then the software application can request, as part of the code it sends back to the pod server 1304, that the pod server 1304 translate the code into a more appropriate format.

Another modification the pod server 1304 can make is that of manipulating the hyperlinks within the code sent by the software provider. Under normal behavior, such a hyperlink would result in opening another browser window and following the link. Here, however, the original hyperlinks are adjusted by the pod server 1304 so that following of the links remains under the control of the pod server 1304 and the user interface remains within the focus of the pod instead of some other browser window.

Once the pod server 1304 completes its changes to the original code in step 1208, the server 1304 can render the code and content to the user's pod 1302, in step 1212.

In addition to the code that is received from the software application 1306, the pod server 1304 can also receive information from the software application 1306 about a billing event that should be triggered for the particular content that the user requested. For example, the user can request a stock quote that will cost $1.00. When the application 1306 generates the content of the reply, it also can generate a message that the pod user should be charged $1.00 for this transaction. It will be appreciated that there is wide variety of protocols for the pod server 1304 and the software application 1306 to exchange information related to a billable transaction. During operation, therefore, the software developer's application 1306 can merely adhere to the agreed upon protocols to inform the pod server 1304 that a billable transaction has occurred.

When the pod server 1304 determines that the code from the application 1306 includes an indication that billing should occur, the pod server 1304 can generate a billing event 1308, in step 1210. This billing event 1308 can be forwarded to the global mobile platform 306 so that billing can occur by using the cellular carrier's underlying billing systems. The pod server 1304 has access to the recipient information, i.e., the pod user, and the billing rate of the pod application 1306. Therefore, an appropriately formatted billing message can easily be generated.

The global mobile platform 306 can include a message interface 1402 to handle billing events from a variety of sources. Although a different interface could be designed for each different source of billing events, it is more efficient to use a single Application Programming Interface (API).

Figure 14:
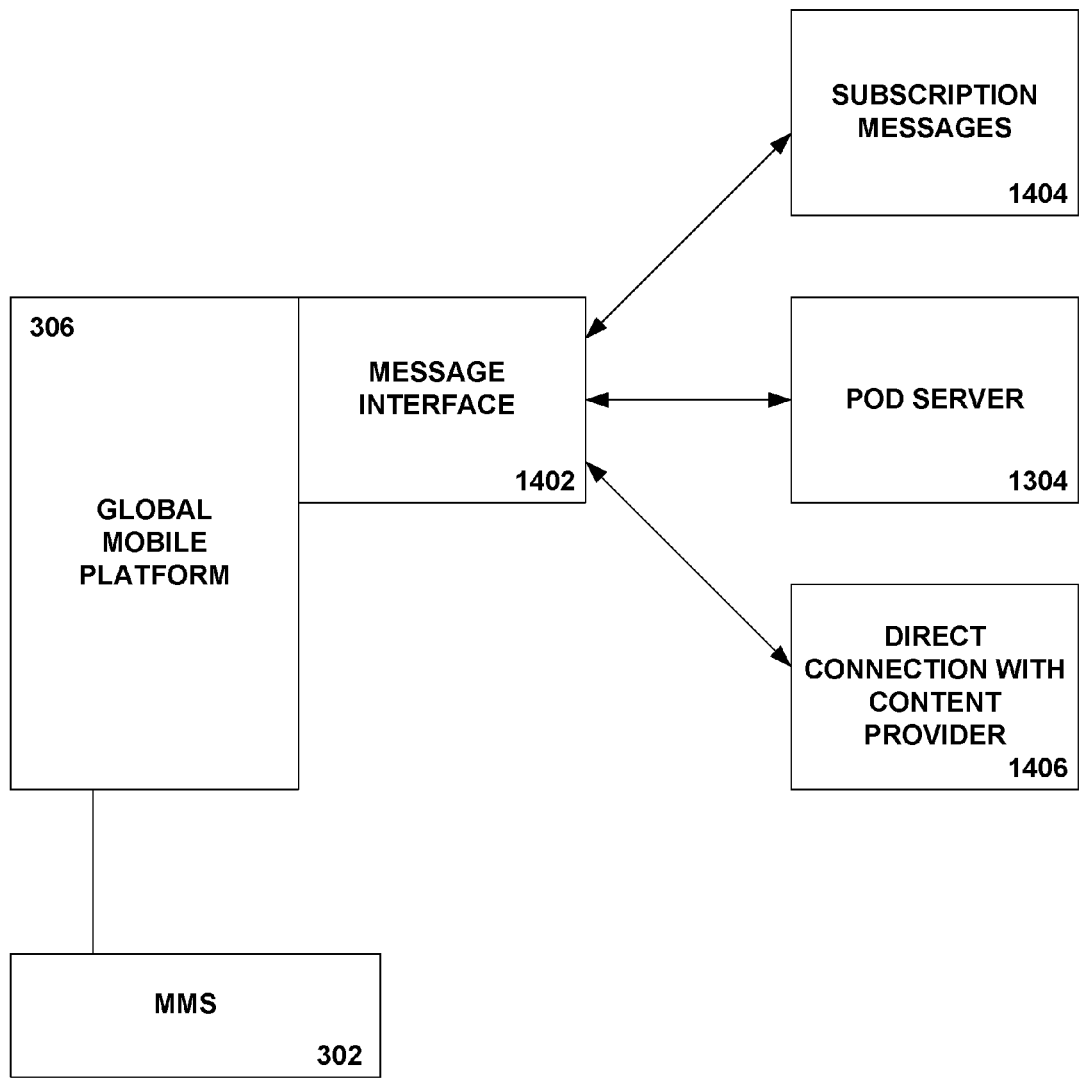
FIG. 14 is a block diagram of a global mobile platform that can be included in the computer-based global mobile community of FIG. 3.

One type of billing message originates from subscription-based services. Under these circumstances, a database or other storage system can maintain a record of when to send a message to a user on a predetermined periodic basis, e.g., daily, monthly, weekly, etc. When the management system for these subscription services indicates that a message is to be sent, then this message can be forwarded to the interface 1402 (FIG. 14) of the global mobile platform 306 with the appropriate tariff information included.

As discussed earlier, the pod server 1304 can also generate a message based on a discrete billable event occurring due to the user's operation of a pod application. In this instance the billing message 1308 can be forwarded to the interface 1402.

In another embodiment, the pod application can operate so as to avoid sending content back through the pod server 1304 but still be designed to perform a billable event. For example, the pod application can be a virtual greeting card application that sends text messages to people based on whether it is their birthday, anniversary, etc., and charges the pod user $0.25 for each card. Thus, the pod application 1306 performs billable activities but not via the content it sends back through the pod server 1304. Under these event-based circumstances, the software provider can establish a direct connection with the interface 1402 and send a billable message via the established API.

Regardless of how the billable event arrives at the interface 1402, the global mobile platform 306 can process it such that a message is sent via the MMS 302 through the cellular carriers to the user of the pod. This message, the content of which may say, for example, "Thank you for being a valued customer of xxx" will have associated with it a tariff code that results in the user being billed via their cellular service account.

Thus, the cellular carrier bills a user for various events and shares an agreed-upon portion of that billing with the mobile community platform which, in turn, shares an agreed-upon portion of that billing with the software provider. The carrier benefits from additional billable data traffic and the software provider benefits by obtaining instant access to all the users of the mobile community 202 as well as instant access to the cellular carriers' billing systems in a seamless and unified fashion through the platform.

The presence of the global mobile platform 306 between the software provider's application 1306 and the MMS 302 provides the benefit that the messaging of different users of the mobile community 202 can be controlled to ensure the mobile community 202 is more enjoyable.

Within the mobile community, the various computer-based components discussed thus far have a vast amount of information stored and readily accessible. For example some of the information can include: identifying information about each pod application, identifying information about each user, identifying information about which pods are associated with each user, information about the terms and conditions regulating the operations of a pod application, and information about messages being sent via the mobile community 202. With this information available, a number of operating parameters of the mobile community 202 can be monitored and controlled.

Figure 15:
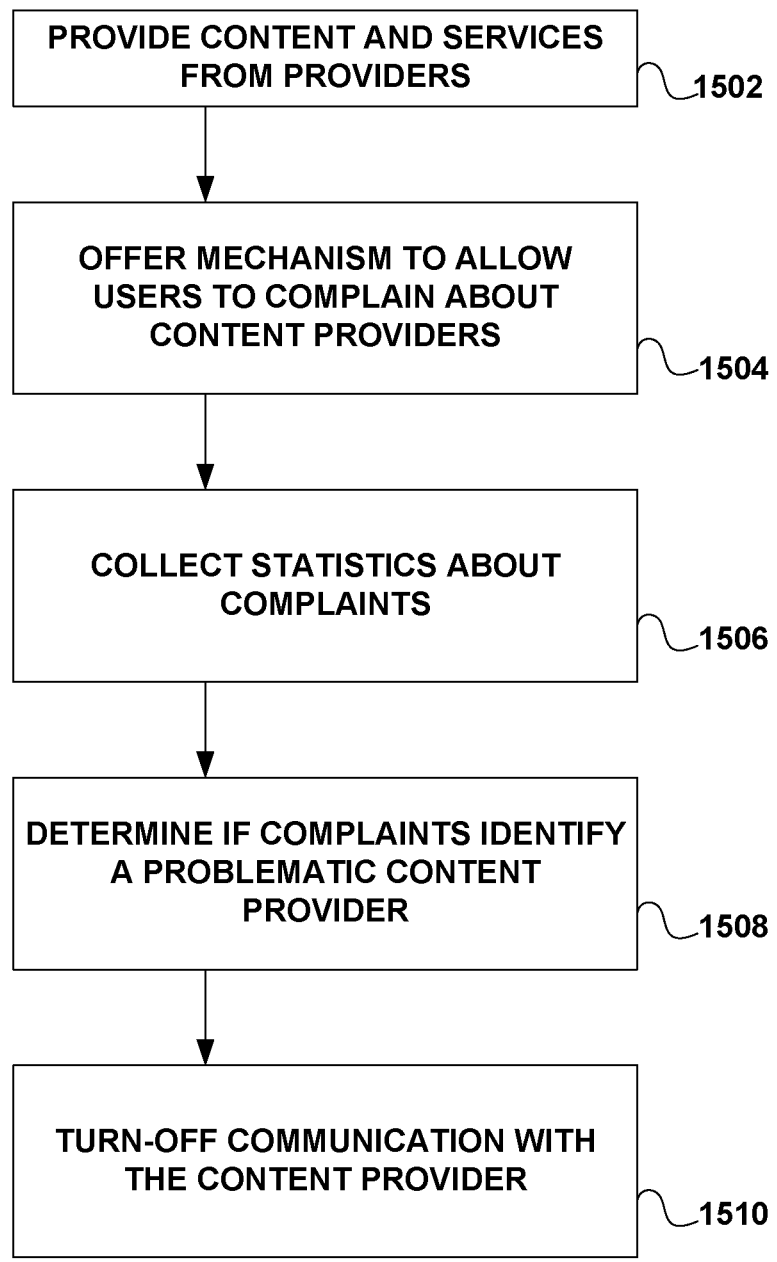
FIG. 15 is a flow chart illustrating an example method for instituting a complaint department within the mobile community of FIG. 2.

FIG. 15 depicts a flowchart of an exemplary method for instituting a complaint department within the mobile community 202, which can ultimately result in automatic cut-off of access to, and billing activities by, a software application. In accordance with this flowchart, while all the parties are using the mobile community 202, content and services are being provided by different software application providers in step 1502. Within the profile page of a user, or alternatively at a more centrally located page, a link can be provided, in step 1504, to submit a complaint. The global mobile platform 306 can then collect these complaints and generate, in step 1506, statistics about them. For example, one statistic can be to identify what percentage of users of a pod application are complaining that it fails to operate as promised, provides unsuitable material, improperly bills, or includes some other problem.

In step 1508, the complaint statistics can be evaluated to determine if a problem exists. Typically there would be checks and balances used to ensure that a single user is not abusing the system with a flood of complaints or that 100 complaints is not really a problem if the user base is 10 million. If a problem is found to exist with a particular pod application, then in step 1510, the global mobile platform 306 can turns-off communication with this pod application. Thus, the pod server 1304 can be informed to ignore any communications to or from that particular application. Because a software provider can supply more than one pod application, the system can be configured to turn-off communication with all applications from that provider, not simply the ones relating to only the problematic application.

Figure 16:
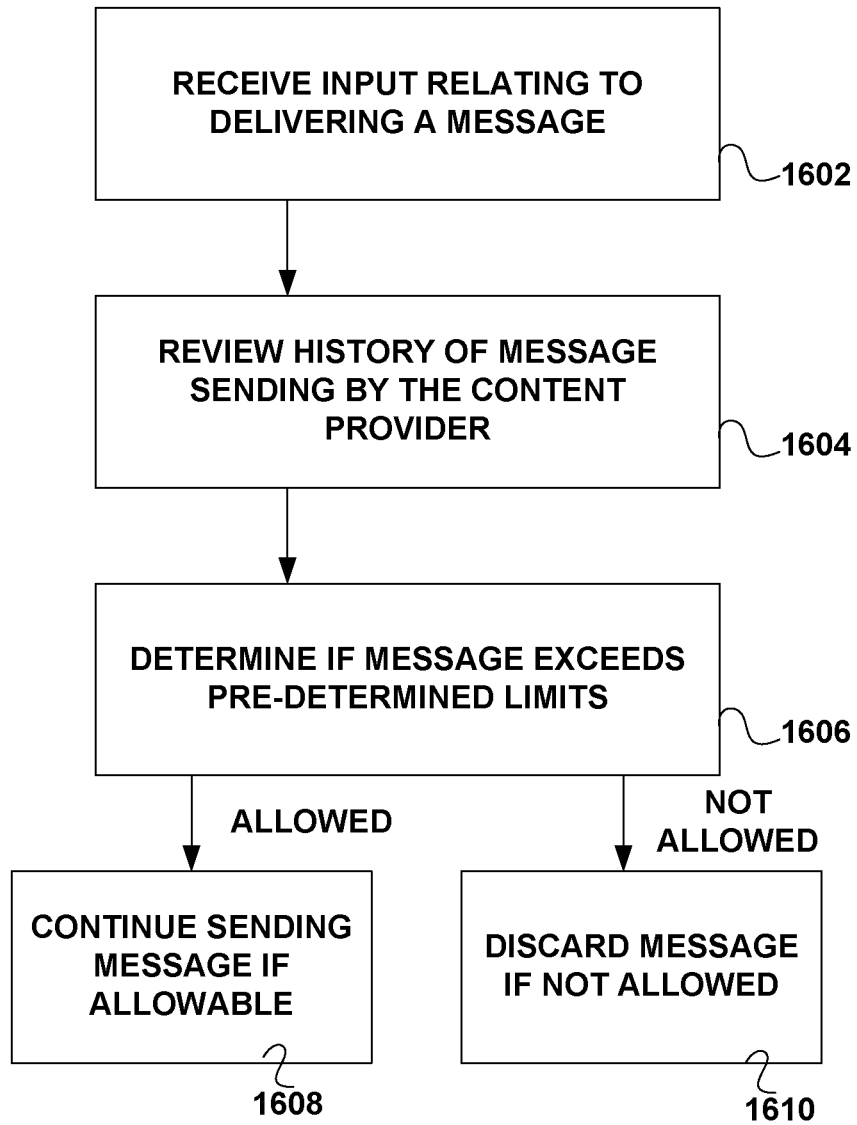
FIG. 16 is a flowchart illustrating an example method for regulating messages within the mobile community of FIG. 2.

FIG. 16 provides a flowchart of an exemplary method for regulating messages such that the agreed upon terms and conditions of the operating parameters of the pod application are adhered to. At the time a subscriber decides to subscribe to an application, the subscriber can be shown details relating to price, message frequency, maximum messages in any given time period, and other terms relating to the specific application. Upon agreeing to those terms and conditions, those terms and conditions can be memorialized for that specific subscriber within the online community, such that if the application provider later changes the price or other terms of the service, such new terms will only apply to the new subscribers that enter a "contract" after the date of change. Thus, the system can ensure enforcement of the original terms and conditions that each individual subscriber was shown and agreed to.

In step 1602, the global mobile platform 304 receives via its interface 1402 a message to send to a user. As part of the agreed upon API, the message arrives from an identifiable source and specifies the recipients for the message. A recipient can be a single user or it can be a group such as "San Diego Padre fans," which the system can expand into the individual subscribers when delivering the message.

Thus, in step 1604, the global mobile platform can analyze historical information about messages sent by this sender to the specified recipient. In step 1606, this historical data can be compared to the pre-defined limits for the message sender. If the message would cause the pre-determined limits to be exceeded, then the message can be discarded in step 1610 thereby avoiding billing of the user. If the message is allowable, then the message can be sent as normal in step 1608.

In the above description, the specific example of a software application provider was described in detail. This specific example was provided merely to highlight many of the features and aspects of the embodiments described herein, but it will be recognized that providers of other types of products and services can also use and benefit from the mobile community 202 of FIG. 2. In particular, embodiments can allow vendors of all types of products and/or services to charge for their products via the mobile community's existing connectivity to the various carrier systems. In practice, a purchaser would consummate a transaction with a vendor for some product or service and, in the process, provide to the vendor a means of identifying that user within the mobile community 202. The vendor, in turn, can communicate with the mobile community, e.g., via the Mobile Global Platform, to initiate a billing event that identifies the purchaser and the transaction amount. As explained above, this billing event can result in the purchaser being billed via their wireless telephone subscriber account. In this way, the wireless telephone account, although this information is not necessarily revealed to the vendor, acts as a virtual wallet allowing the purchaser to easily pay for a variety of different types of transactions.

At least certain portions of community 202 and platform 306 are intended to be implemented on or over a network such as the Internet. An example of such a network is described in FIG. 1. The description of the network and computer-based platforms that follows is exemplary. However, it should be clearly understood that the embodiments described herein can be practiced without the specific details described herein. Well known structures and devices are shown in block diagram form in order to avoid unnecessarily obscuring the embodiments described herein.

Figure 1:
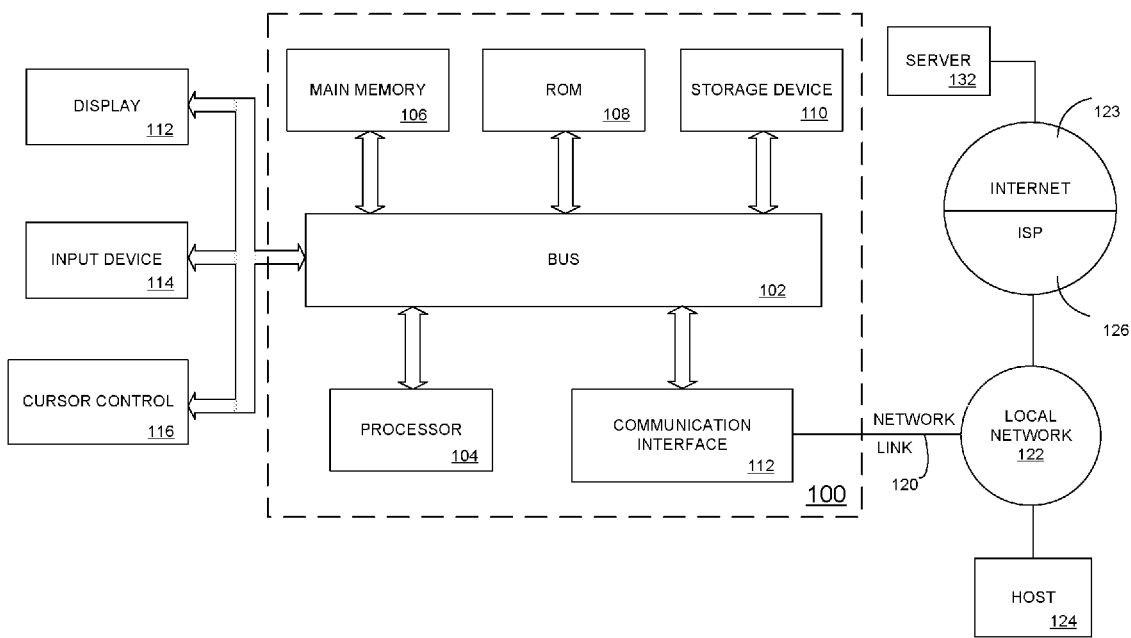
FIG. 1 is a block diagram that illustrates an exemplary computer system that can be configured to implement the systems and methods described herein.

FIG. 1 is a block diagram that illustrates a computer system 100 upon which the embodiments described herein can be implemented. Computer system 100 can include a bus 102 or other communication mechanism for communicating information, and a processor 104 coupled with bus 102 for processing information. Computer system 100 can also include a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Computer system 100 can further include a read only memory (ROM) 108 or other static storage device coupled to bus 102 for storing static information and instructions for processor 104. A storage device 110, such as a magnetic disk or optical disk, can be provided and coupled to bus 102 for storing information and instructions.

Computer system 100 can be coupled via bus 102 to a display 112, such as a cathode ray tube (CRT), for displaying information to a computer user. An input device 114, e.g., including alphanumeric and other keys, can be coupled to bus 102 for communicating information and command selections to processor 104. Another type of user input device can be cursor control 116, such as a mouse, a trackball, or cursor direction keys for communicating direction information and command selections to processor 104 and for controlling cursor movement on display 112. Such an input device typically has two degrees of freedom in two axes, a first axis (e.g., x) and a second axis (e.g., y), that allows the device to specify positions in a plane.

Computer system 100 can operate in response to processor 104 executing one or more sequences of one or more instructions contained in main memory 106. Such instructions can be read into main memory 106 from another computer-readable medium, such as storage device 110. Execution of the sequences of instructions contained in main memory 106 causes processor 104 to perform the process steps described herein. In alternative embodiments, hardwired circuitry can be used in place of or in combination with software instructions. Thus, the embodiments described herein are not limited to any specific combination of hardware circuitry and software.

The term "computer-readable medium" as used herein refers to any medium that participates in providing instructions to processor 104 for execution. Such a medium can take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media can be involved in carrying one or more sequences of one or more instructions to processor 104 for execution. For example, the instructions can initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 can carry the data to main memory 106, from which processor 104 can retrieve and execute the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic, or optical signals that carry digital data streams representing various types of information.

Network link 120 can provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 can both use electrical, electromagnetic, or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118. The received code can be executed by processor 104 as it is received, and/or stored in storage device 110, or other non-volatile storage for later execution. In this manner, computer system 100 can obtain application code in the form of a carrier wave.

As mentioned, a developer can create and develop a pod application in a number of different ways using any of a variety of different development languages and environments. While different pod applications can accomplish many different purposes, there are certain functions that many pods will have in common. For example, sending an e-mail message or a text message to a recipient can be a common function shared among diverse pod applications. Also, building a query string for a database or forwarding a media file to a rendering engine are some functions that many different pod applications will likely include as well. Thus, the availability of libraries of re-usable code can advantageously be provided within one or more implementations of the system described herein. For example, referring to FIG. 3, a set of libraries 301 can be provided to developers who log into the pod application development system. The developer can locate within the libraries of code 301, in anyone of many different languages, one or more previously developed functions or code-segments that pertain to a pod application the developer is designing. Once located, these code segments can then be downloaded by the developer and used, and re-used, in the development of pod applications. In one embodiment, the developer libraries 301 can also allow developers to upload their own code to further widen the variety of available libraries for downloading by other developers. Appropriate security and code checking should be implemented to ensure unsafe or malicious code is not uploaded to the developer libraries 301.

In FIG. 3, the developer libraries 301 are shown as a logical block available through the global mobile platform 306. This depiction is exemplary in nature and it will recognize that the libraries 301 can be provided in a variety of different storage formats, computer platforms, and interconnected systems.

Using the developer's own resources as well as the available developer libraries 301, a developer can design various pods such as a pod to share music and/or alert users about the availability of new music. In addition to music, other media files such as video, text data, pictures and other digital content can be shared through developer-created network-enabled applications as well.

In other embodiments, the aforementioned platform 306 can provide support tools, functions, and services to allow developers to easily develop network-enabled applications that are dynamic and community-based for access and use by mobile phone users to provide information, content and/or services to mobile phone users and billed on a micro-transaction level through the platform. The support tools, functions and services can enable the network-enabled applications to provide the user with consistent community functions and to communicate data to and from the network-enabled application in a dynamic fashion.

Figure 17:
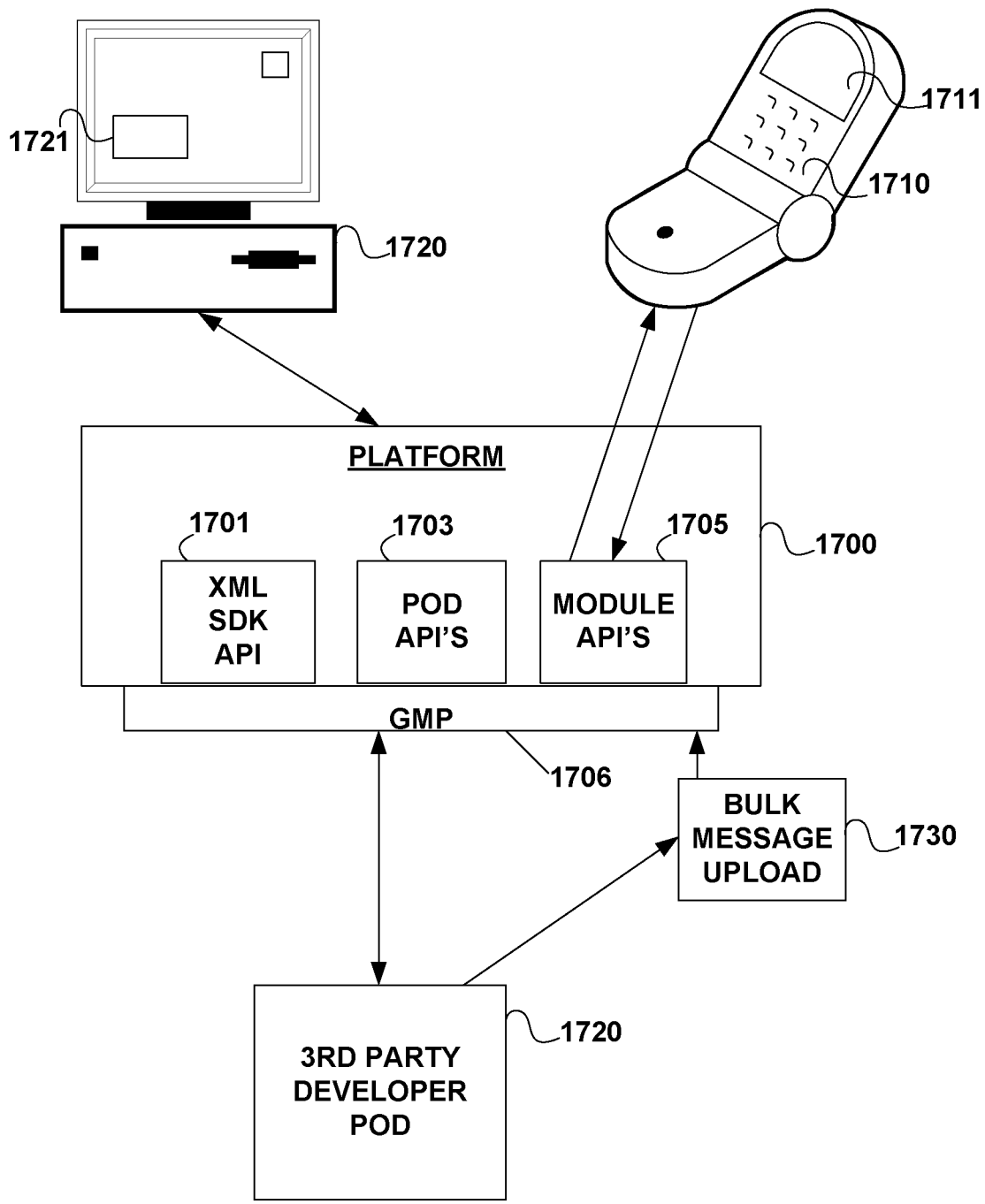
FIG. 17 is a block diagram illustrating another example embodiment of the global mobile platform of FIG. 3.

In this regard, FIG. 17 depicts an exemplary embodiment of the above-described community platform. As seen in FIG. 17, mobile community platform 1700 is provided which is described above as mobile community 202 of FIG. 2, and includes the components described above with respect to FIG. 3. In the embodiment shown in FIG. 17, mobile community platform 1700 can include several sets of APIs that are used by a third party developer to develop network-enabled applications and also that are used by platform 1700 to provide community-based dynamic functionality to network-enabled applications thereby allowing users of such network-enabled applications to benefit from the community services and functions available through community platform 1700.

In particular, community platform 1700 can be seen to include xPML software development kit (SDK) APIs 1701, Pod APIs 1703 and Mobile APIs 1705. In the example of FIG. 17, xPML SDK APIs 1701 and Pod APIs 1703 are preferably made available to third-party developers through global mobile platform 1706, e.g., as described of above with respect to FIG. 3, of community platform 1700. Mobile APIs 1705 can be used by community platform 1700 to convert a network-enabled application functionality for display and use of the network-enabled application on a mobile device, such as a mobile phone 1710, instead of on a personal computer, such as computer 1721. In FIG. 17, third party network-enabled application 1720 can be developed by a third party incorporating some or all of the functional interface, functions, and services provided by xPML SDK APIs 1701 and Pod APIs 1703, and can offer the developed network-enabled application 1720 through community platform 1700 to users of community platform 1700. Community platform 1700 can then render the pod 1721 in HTML according to the APIs implemented in network-enabled application 1720 for access and use on computer 1720, or if mobile phone 1710 is being used to access network-enabled application 1720, then it is rendered in a mobile protocol, such as WAP or other suitable protocol for the display 1711 on mobile phone 1710.

xPML SDK APIs 1701 can be provided by platform 1700 to third party developers to implement into a network-enabled application in order to take advantage of community services and functions offered by platform 1700. Among other functions and services, xPML SDK APIs 1701 can provide function "tags" that a third-party developer can incorporate in a network-enabled application to add community functionality and efficient communication to the network-enabled application.

Figure 18:
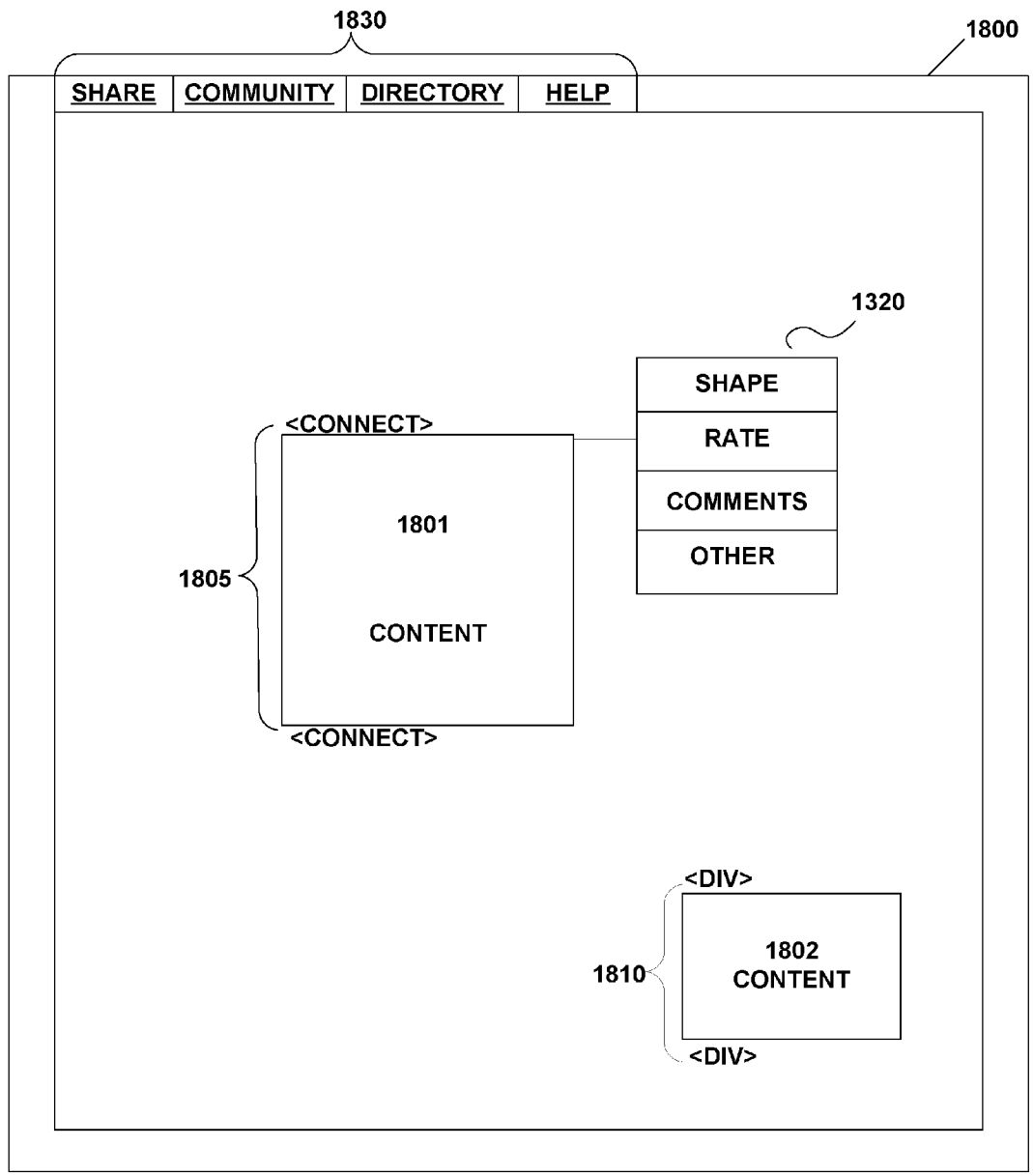
FIG. 18 is a diagram illustrating an example pod that includes content and content tags according to one embodiment.

FIG. 18 is a depiction of a network-enabled application 1800 that was developed using tags provided by xPML SDK APIs 1701. As seen in FIG. 18, the use of certain tags within an network-enabled application are graphically demonstrated for explanatory purposes. In the example of FIG. 18, a third-party developer has configured content area 1801 and content area 1802 within the frame of pod 1800 for displaying desired content. For example, content area 1801 can be a picture, and content area 1802 can be dynamic text that contains comments related to the picture in content area 1801. As further seen in FIG. 18, the third party developer can incorporate tags 1805 that bracket content area 1801, and also tags 1810 that bracket content area 1802. In this example, both of tags 1805 and tags 1810 are provided by xPML SDK APIs 1701.

Tags 1805 are <content>tags that allow a user of network-enabled application 1800 to use community-based functions with respect to the content that is bracketed between <content> tags 1805. In this regard, when a user scrolls the mouse or pointing device over content area 1801, the content tags 1805 trigger the display of a pop-up side menu 1820, which contains several community-based menu functions. Menu 1820 can allow a user of pod 1800 to share the content of content area 1801 with other users of the community platform, to rate the content of content area 1801 for other users of pod 1800 to see, to enter comments regarding the content of content area 1801 for other users of pod 1800 to see, or other community-based functions, such as receiving information about more network-enabled applications that are popular with other users of this pod, and such as obtaining help information related to this pod. In this manner, a third party developer can easily incorporate and take advantage of the community-based functionality and services supported by the community platform simply by incorporating the <content> tags provided by xPML SDK APIs 1701.

Also seen in FIG. 18, the tags 1810 that bracket content area 1802 are <div> tags. These <div> tags can allow the content in content area 1802 in between the <div> tags to be refreshed without having to refresh the entire display of pod 1800. In this manner, only some displayed content on pod 1800 can be refreshed and updated, without needing the time, bandwidth, and computing resources necessary to update the entire pod display. For example, the targeted content area can contain a static picture, and content area 1802 can contain a text display of the most recent comment related to the picture entered by all users of pod 1800. When a new comment is entered by one of the users of pod 1800, then only content area 1802 is updated to display the new content because of the use of the <div> tags around content area 1802. This is more efficient than having to re-render the entire display of pod 1800. This targeting method can be used with any other HTML element, not just <div> tags.

Of course, many other functions and services are supported by tags provided by xPML SDK APIs 1701. In addition to the <content>and <div> tags, tags provided by xPML SDK APIs 1701 can also include tags for incorporating predetermined menus into the pod, and for allowing a developer to set up a user dictionary related to the pod in order to request information about certain items subjects related to the pod.

Returning to FIG. 17, Pod APIs 1703 can provide functions and services for the third party developer to incorporate into network-enabled application 1800 to easily render the graphic interface of the frame, as opposed to the content window, of network-enabled application 1800, and also to incorporate a standard set of menus into the pod frame, such as along the upper tool bar area of the pod frame. In this manner, the pods developed for use with platform 1700 can all have a consistent look and feel to them, and also can have a same basic set of standard menus for operation of the pod and for access and use of community services.

In this regard, when a third party developer develops a network-enabled application that incorporates APIs from Pod APIs 1703, a pod frame can be rendered for display to a user of the pod in a predetermined fashion, and can also incorporate a standard set of functional menus in the upper toolbar of the pod frame. Pod 1800 of FIG. 18 demonstrates a pod frame that is rendered according to a predetermined API that the developer of pod 1800 simply incorporated into network-enabled application 1800. In addition, the upper toolbar 1830 of pod 1800 can be implemented by the third party developer of pod 1800 simply by incorporating an API from Pod APIs 1703. As seen in FIG. 18, upper toolbar 1830 can include functional menus for "Share," "Community," "Directory" and "Help." For example, the "Share" menu of upper toolbar 1830 can allow the user of pod 1800 to send a message to other users recommending this network-enabled application to them. The message can be sent by SMS, IM, email, or other means.

The "Community" menu of upper toolbar 1830 can allow the user of pod 1800 to rate network-enabled application 1800, such as by a range of 1 to 5 stars, or to comment on network-enabled application 1800 for other users of network-enabled application 1800 to view, or to access a blog related to network-enabled application 1800. The "Directory" menu of upper toolbar 1830 can display a list of other network-enabled applications that are recommended by other users of this network-enabled application, and the "Help" menu of upper toolbar 1830 can allow the user to access help related to network-enabled application 1800, such as by contacting the developer/operator of pod 1800 for assistance. In this manner, many different types of network-enabled applications can be provided to the community, while still maintaining a same look and feel, and basic community functionality among all of the network-enabled applications.

Returning back to FIG. 17, Mobile APIs 1705 is seen provided in platform 1700, and can provide a set of interfaces to allow a network-enabled application, and a user's home page, to be displayed on a mobile device, such as mobile phone 1710. In this regard, the community platform can recognize when a user is requesting to access a network-enabled application from a computing device, such as computer 1720, or from a mobile device, such as mobile phone 1710. Platform 1700 can then render network-enabled application 1720 appropriately, such as in HTML 1721, if the pod is being accessed from computer 1720, or in WAP by using Mobile APIs 1705, if the pod is being accessed from mobile phone 1710. The detection of the type of device accessing the network-enabled application, and the appropriate rendering based on that detection, is discussed above with respect to FIG. 13.

Platform 1700 can also pass the detection of the type of device accessing the pod to network-enabled application 1800, so that the developer can include logic to change the functionality of network-enabled application depending on the type of device that is accessing the pod. Also as seen in FIG. 17, Mobile APIs 1705 can support two-way communication between platform 1700 and network-enabled application 1711 on mobile phone 1710. In this manner, the user of an network-enabled application on mobile phone 1710 can have two-way communication via the network-enabled application, such as to receive and reply to messages from the developer/operator of the network-enabled application.

Also, the user of network-enabled application 1800 can enter commands to network-enabled application 1720 via mobile phone 1710 and then receive responses in network-enabled application 1800 from platform 1700 or from the developer/operator of pod 1700. For example, if network-enabled application 1800 is a stock price reporting service, then the user can enter a new requested stock name via mobile phone 1710, and a message can be sent from mobile phone 1710 to platform 1700 and on to the developer/operator 1720 to obtain the requested stock price, which can then be sent back to mobile phone 1720 via platform 1700. In this manner, network-enabled applications that incorporate the functionality of Mobile APIs 1705 can provide dynamic communication and functionality to the user on a mobile device. The communication between mobile phone 1710, platform 1700 and the developer/operator can be in SMS, MMS, email or other communication means.

In this regard, Mobile APIs 1705 also provides the functionality for the third party developer/operator of a network-enabled application to easily send communications to users of the network-enabled application. In particular, the developer/operator can address messages to be sent to all users of the network-enabled application, or to specific users as addresses by a user ID. In this manner, users of the network-enabled application can receive new content through the network-enabled application on a periodic basis, or can receive information messages from the developer/operator regarding the network-enabled application. Mobile APIs 1705 can also provide a developer/operator with the functionality to schedule a block of various messages to be sent to various users of the network-enabled application for a predetermined duration of time.

For example, if the developer/operator can schedule all messages that need to be sent to all users, and to only some specified users, over the course of the next three months. This feature greatly assists the developer/operator in getting data and information sent to users of the network-enabled application for a long period of time. This "bulk" scheduling of messages to users of network-enabled application 1720 is shown in FIG. 17, in which the developer/operator uploads to platform 1700 a bulk schedule 1730 of many messages to be sent to various groups of users of network-enabled application 1720. The messages in bulk schedule 1730 can then be delivered by platform 1700 to users according to the appropriate date/time and appropriate user IDs to which each message is addressed.

In another embodiment, the foregoing community platform and APIs can be implemented in a method and system that automatically generates an application music pod for a third party through which the third party's music content and music-related information is offered for access, purchase, and use by mobile phone users within a community network. The billing for such purchase of music content can automatically be made through the community platform to the mobile phone user's mobile carrier account on a micro-transaction basis.

Figure 19:
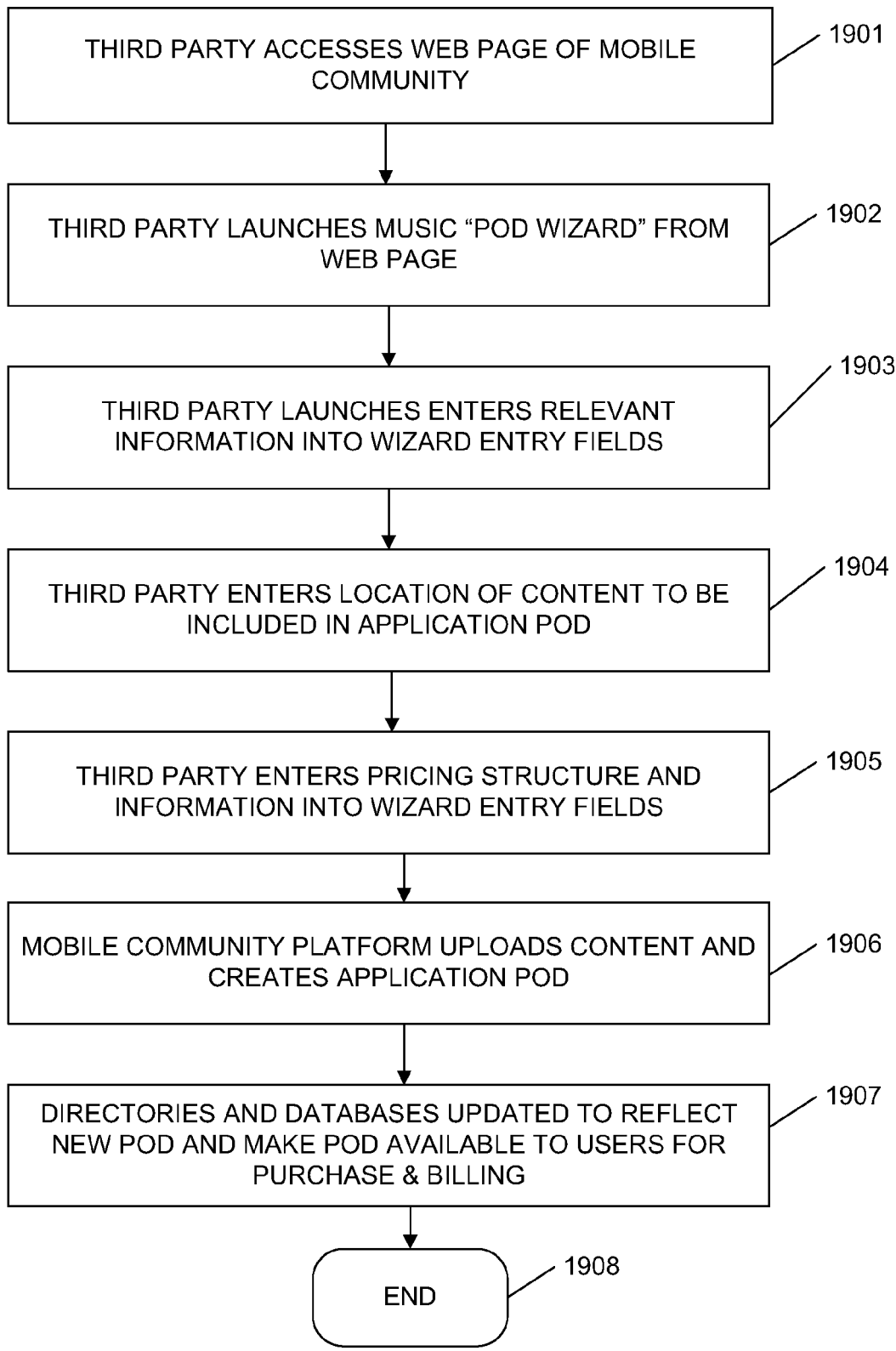
FIG. 19 is a flow chart illustrating an example method for creating, registering and enabling a music pod with the mobile community of FIG. 1.

FIG. 19 is a flowchart that explains the automatic generation of application music pod for a third party that allows the third-party's music to be made accessible though the community network for access, purchase, and use by the mobile phone users of the community network. In step 1901 of FIG. 19, a third party with music content, such as a musician, can first accesses a web page provided by the mobile community that allows third parties to have a music network-enabled application automatically generated to offer their music content, and music-related information, for access, purchase, and use by users of the mobile community. In step 1902, the third party launches an application, or "music pod wizard," from the web page in order to begin the process of automatically generating an application music pod, or network-enabled music application for the third party. It can be appreciated that the "music pod wizard" can be a series of web pages, a single web page, a program or applet, or other known method for entering information remotely via a network to a server.

In step 1903, the third party enters relevant information into provided music pod wizard entry fields. Such requested information can vary according to the type of music content that the third party will be offering through the network-enabled music application. For example, the third party can be required to enter their name and contact information, with a description of the music content they are offering. It can also be required for the third party to indicate the language in which the music content is offered, and other information about the third party/author of the music content, such as biographical information, history of development of other music content by the third party, and other relevant information such as calendar events related to the third party, e.g. speaking engagements, appearances, concerts, etc.

In step 1904, the third party enters the location of the music content that is to be offered through the network-enabled music application into a provided entry field of the music pod wizard. This can be a file location on the user's computer, and can be obtained through a browse button provided in the music pod wizard page. Also, the location can be a remote location, such as a URL address of a website that the music can be accessed from. Also, entry fields can be provided in the music pod wizard for the third party to provide a unique artist/band name, and music descriptions (short and long descriptions), as well as a location of graphic or picture that is to be used in the mobile community 202 in association with the network-enabled music application.

In step 1905, the third party can enter the desired pricing structure and pricing information for the application music pod. The music pod wizard can provide entry fields for the third party to set the price that is charged to the user for subscribing to the pod, and also can allow the third party to send messages to the subscribing users that are related to the network-enabled music application content. In this manner, the third party can set the price that is then automatically billed to the user when the user subscribes to the network-enabled music application through the user's existing cellular carrier billing account, as is more fully described above. In addition, the music pod wizard can provide entry fields to allow the third party to set a number of messages per day that can be sent by the third party to the subscribers of the network-enabled music application, and a price level for each message that is sent to a subscriber. The third party can then review a representation of the appearance of the network-enabled music application before finally submitting the music pod wizard entries for creation of the network-enabled music application.

Next, in step 1906, the mobile community 202, through a server and computing devices, uploads the music content and related information, photos, videos, etc., from the content location provided by the third party in the music pod wizard entries, and then creates a network-enabled music application that contains the uploaded content. The network-enabled music application can preferably be created using a set of predetermined graphic functions and software functions (APIs) to implement the pod frame and the functions commonly associated with a pod provided through the mobile community 202, as discussed above with respect to FIGS. 17 and 18. The APIs can also provide community functions through which a user of the network-enabled music application can interact with other members of the mobile community 202 regarding the network-enabled music application, also as discussed above with respect to FIGS. 17 and 18.

Once the application music pod is created, the directories and databases of the mobile community 202 can be updated to implement the network-enabled music application and make it accessible to users of the mobile community 202 for purchase and use (step 1907). Upon purchase/subscription of the network-enabled music application by a user, the user can be automatically billed through the existing billing system of the user's respective cellular carrier by the community platform 202, as described in detail above. Different views of the network-enabled music application can be presented to a user depending on whether that user has purchased/subscribed to the network-enabled music application. A user who has not purchased the network-enabled music application can see a limited view ("public view") of the network-enabled music application, while a user who has purchased the network-enabled music application can view the entire music content ("private view"). The process then ends in step 1908.

The community platform 202 can also allow users to purchase music content individually, such as by song, from a music store, instead of purchasing/subscribing to the network-enabled music application. Also in this latter embodiment, the user can be automatically billed for purchase of individual music through the existing billing system of the user's respective cellular carrier by the community platform. In this manner, the community platform can provide a system and mechanisms that allow an artist to easily offer their music and music-related information to users of the community through a specific music pod or directly through a music store of the community platform. The artist/musician can sell their music by taking advantage of the automatic billing mechanisms of the community platform 202 which bill the user/purchaser on a micro-transaction level through the user's existing mobile phone carrier account. The artist/musician can also easily manage and update the artist's music content and other music-related information that the artist makes available through the artist's music pod and community platform 202. The music pods, like other network-enabled applications, can be accessed by users on their computers or on mobile devices, such as mobile phonesm as discussed in more detail above.

Artist/musicians can go directly to the above-mentioned web page to launch the music pod wizard, or they can be invited to go to the web page in response to an invitation, such as an email invitation, sent to them by the community platform 202. In this regard, an automatic "crawler" application can be implemented in the community platform 202 to search for websites of artist/musicians and then send an invitation email to the contact address of the artist/musician, which contains a link to the web page of the music pod wizard.

In certain embodiments, the crawler application can actually download information form the artist's website, such as album covers, song lists, song descriptions, biographical information, etc. The music pod wizard can then automatically generate a music pod using the downloaded information. In other words, at least portions of steps 1903-1907 can be performed automatically using the information downloaded from the artist's website. The invitation link can then link the artist to the music pod created with their information.

When a musician launches the music pod wizard, the musician can be presented a series of web pages to help the musician generate his music pod. The web pages can includes entry fields provided in the music pod wizard pages for the musician to enter: Login Information that the musician will subsequently use to access the musician's music pod; Contact Information so that the musician can be contacted by the operators of the community platform; Artist/Band Information to enter the artist/band name, and a URL of an existing website for the artist, if any; and an Artist/Band Agreement which is a standard legal agreement that the artist agrees to abide by.

Once the above information IS provided, a web page can be presented to the musician that allows the musician to initiate the music pod wizard so that the artist can upload and/or manage the artist's music, and music-related information, that will be offered through the artist's music pod. In certain embodiments, the music pod wizard can create a music pod for the artist that is a multi-page application, including a "home" page, and "about" page, a "calendar" page, a "photo gallery" page, a "music" page, a "videos" page, and a "pricing" page.

The artist can select from one of several templates to use as the design for the artist's music pod. The artist can also manage the home page of the artist's music pod by entering text for the home page, such as a description of the artist/band, and by uploading a photo to be used on the artist's music pod home page. The artist can also enter biographic information about the artist/band and a photo for the "about" page of the artist's music pod. The artist can also be allowed to enter new calendar entries for the artist/band such as upcoming appearances, concerts, promotions, etc., and also to manage existing calendar entries. Event date, time, information and corresponding photo can be added for each calendar entry. Pages can be presented for the artist to upload and manage photos of the artist/band for the "photo" page of the of the artist's music pod. The photos can be arranged in galleries for viewing through such photo page.

The artist can upload and manage music of the artist/band to be offered through the "music" page of the of the artist's music pod. The artist can enter descriptive information and album cover photo to correspond to a song that is uploaded from the location provided by the artist. Existing song entries can, e.g., be managed by reorganizing them, editing them or deleting them. The artist can upload and manage video content of the artist/band to be offered through the "video" page of the of the artist's music pod. The artist can enter descriptive information and search tags and a video file that is uploaded from the location provided by the artist. Existing video entries can be managed by reorganizing them, editing them or deleting them.

The artist can set the pricing level to be charged to a user to purchase/subscribe to the artist's music pod. A confirmation message can be entered that will be sent out from the community platform when the user successfully purchases/subscribes to the artist's music pod.

The community functionality describe above can be automatically included in the top toolbar of the music pod frame, by including drop down menus for Share, Community, Directory and Help, as discussed in detail above with respect to Pod APIs. Within the pod frame, a music pod toolbar can be included that in turn includes page buttons for Artist Home, About (bio), Calendar, Photos, Music, Videos and Fans. In this manner, the music pod provides a comprehensive and organized conduit to provide not only the artist/band's music, but various forms of music-related information regarding the artist/band.

When an artist creates a music pod and uploads music files they can, in certain embodiments, then be offered through the music pod. But the music files can also become available for purchase through the "music store" of the community platform. In this manner, users of the community platform may purchase music of an artist by either purchasing the artist's music pod, or by purchasing the artist's music directly through the "music store" of the community platform. As mentioned above, the music store uses the billing mechanisms of the community platform to bill the user directly through the user's existing mobile carrier account for music purchased by the user.

Tabbed pages can be provided under the music store, which can be accessed through a user's home page. One of these tabs can be a "music store" tab that when selected by the user can allow the user to search/browse for music offered for purchase by the music store according to different categories, such as genres, artist or search tags. The "music store" page can also have fields for displaying the most popular songs, the newest songs, and the songs of the friends of the user. The user can preferably listen to a short preview sample of the song before purchasing the song, and can rate the songs.

Another tab can be the "my music" tab page of the music store. In this page, the music content that has been purchased by the user is shown, and can be organized and browsed by playlists and tags. The user can also rate each song, if desired.

A music page can also be dedicated to a specific user and can be accessible on the user's computer or on the user's mobile device, such as a mobile phone. This page is similar to the "my music" tab page of the music store discussed above, and allows the user's purchased music content to be displayed, played, and rated. Music is also recommended to the user based on the music that the user has already purchased.

In certain embodiments, when a customer attempts to add content, they can be provided with a means for a one-time opt-in. In particular, in certain embodiments, such a one-time opt-in can be provided when a verified customer attempts to add a video or song for the first time. Although, it will be understood that the embodiments described can apply for other types of content as well.

Alternatively, the one-time opt-in can be provided when a customer shows interest in certain types of content, or via any other initiation scheme.

If the customer is not verified, but only registered, e.g., with community 202, then the customer can be taken to a verification page as described below. In general, the customer should preferably be both registered and verified in order to select the one-time opt-in service, with the exception of a registered user who is not yet verified but has available funds in the user's account, or in the case of registered users who applying promotional credits toward the acquisition of content within community 202.

Figure 20:
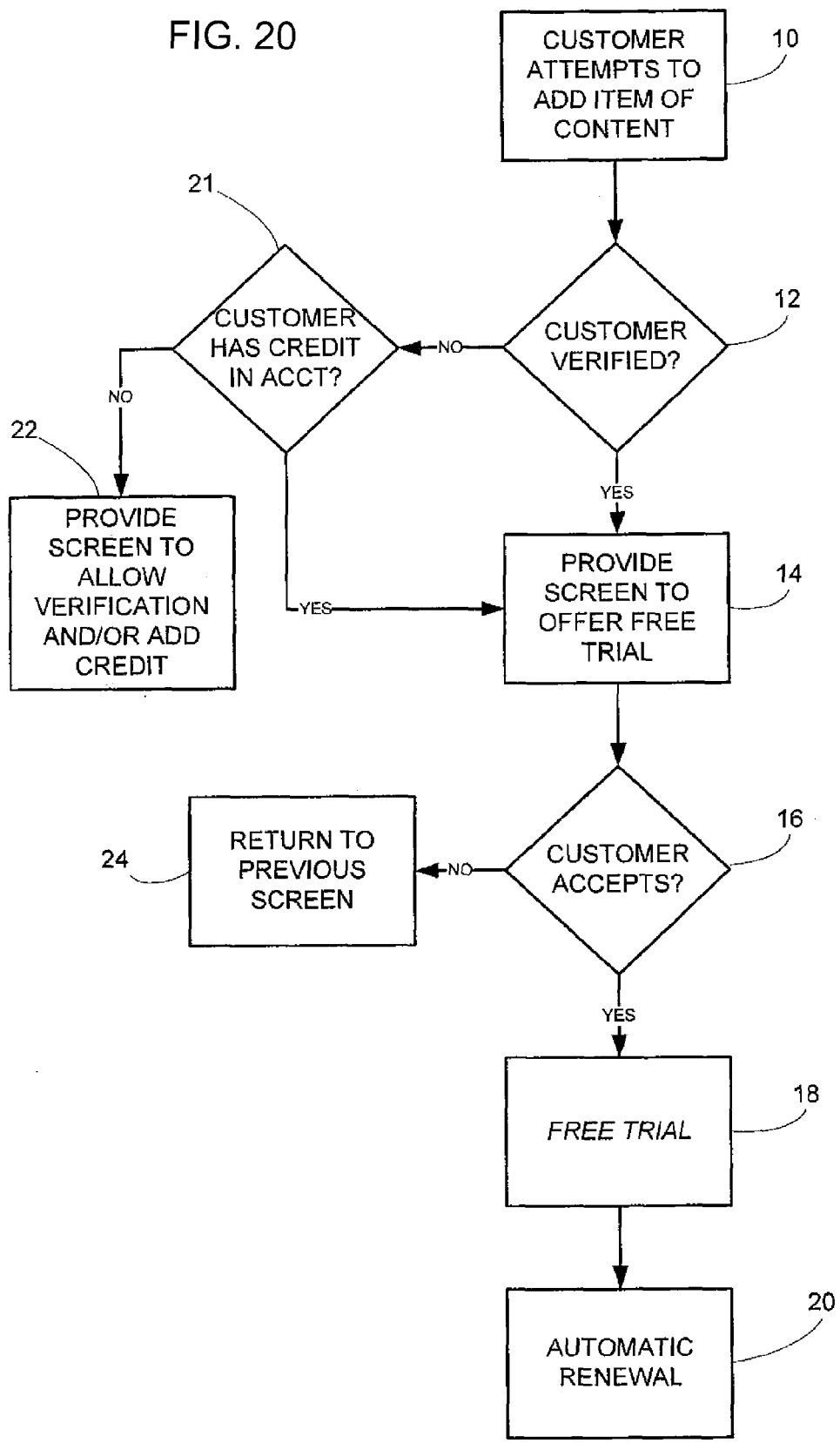
FIG. 20 is a flowchart depicting a method for one-time opt-in according to an embodiment.

Referring to FIG. 20, a customer can attempt to add an item of content (step 10). A check can then be made as to whether the customer is verified (step 12). If not, a check can be made as to whether the customer has funds, such as money or credits, available in their account for a purchase (step 21). If they do, then the free trial can be offered (step 14). If not, the customer can be taken to a screen where verification can be initiated or where funds can be replenished into the account (step 22).

It should be noted that funds can be from the customer depositing money into their account, from the sale of content by the customer, or by various promotions in which the customer is provided with such funds.

Once the customer is verified or determined to have been already verified, or determined to have funds in their account, a free trial can be offered to the customer (step 14). The customer can be given the choice to accept or decline (step 16). The customer can decline (step 24). If the customer does not decline, then the customer can be provided the free trial (step 18).

After being taken through the one-time opt-in process, the customer can be returned to the point in the video or song where the preview stopped so that they can resume and finish watching or listening to it. In an alternative embodiment, the customer can be returned to the end of the video or song, or to another page as may be appropriate given the context.

In any event, upon termination of the free trial, an automatic renewal can occur, which may or may not be free (step 20). The renewal can be, e.g., for a certain number of songs or videos for a set fee, with additional songs or videos available at additional expense.

Figure 21:
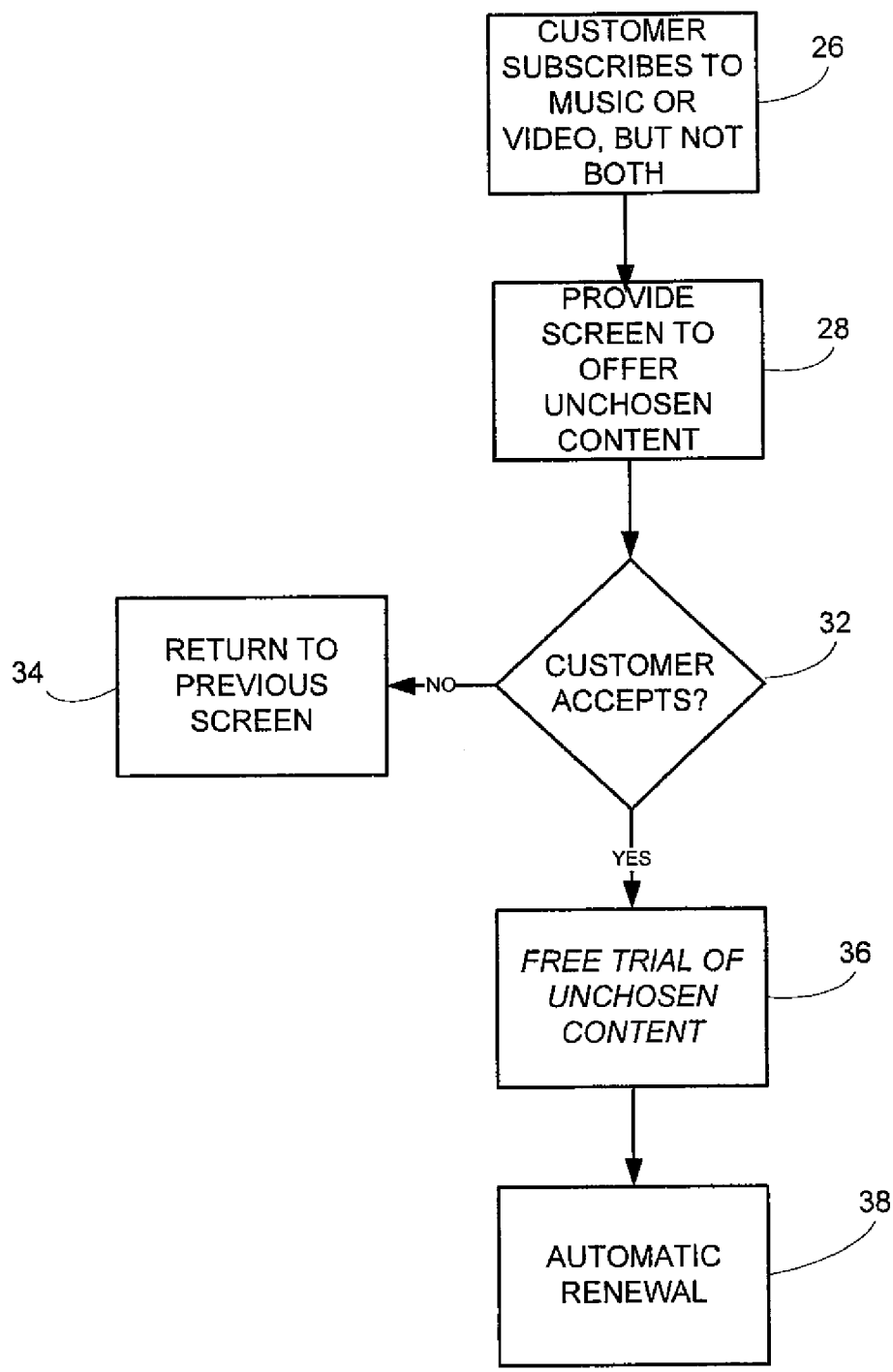
FIG. 21 is a flowchart depicting a method for one-time opt-in according to another embodiment.

Referring to FIG. 21, if a customer subscribes to one type of content (step 26), such as music or video but not both, then at a later time the customer can be given the option to subscribe to the other (steps 28 and 32). If they choose not to do so, then they can simply be returned to whatever page they were on before the offer (step 34). If they choose to subscribe, then a free trial of the un-chosen content can commence (step 36), which can in turn lead to automatic renewal (step 38).

Figure 22:
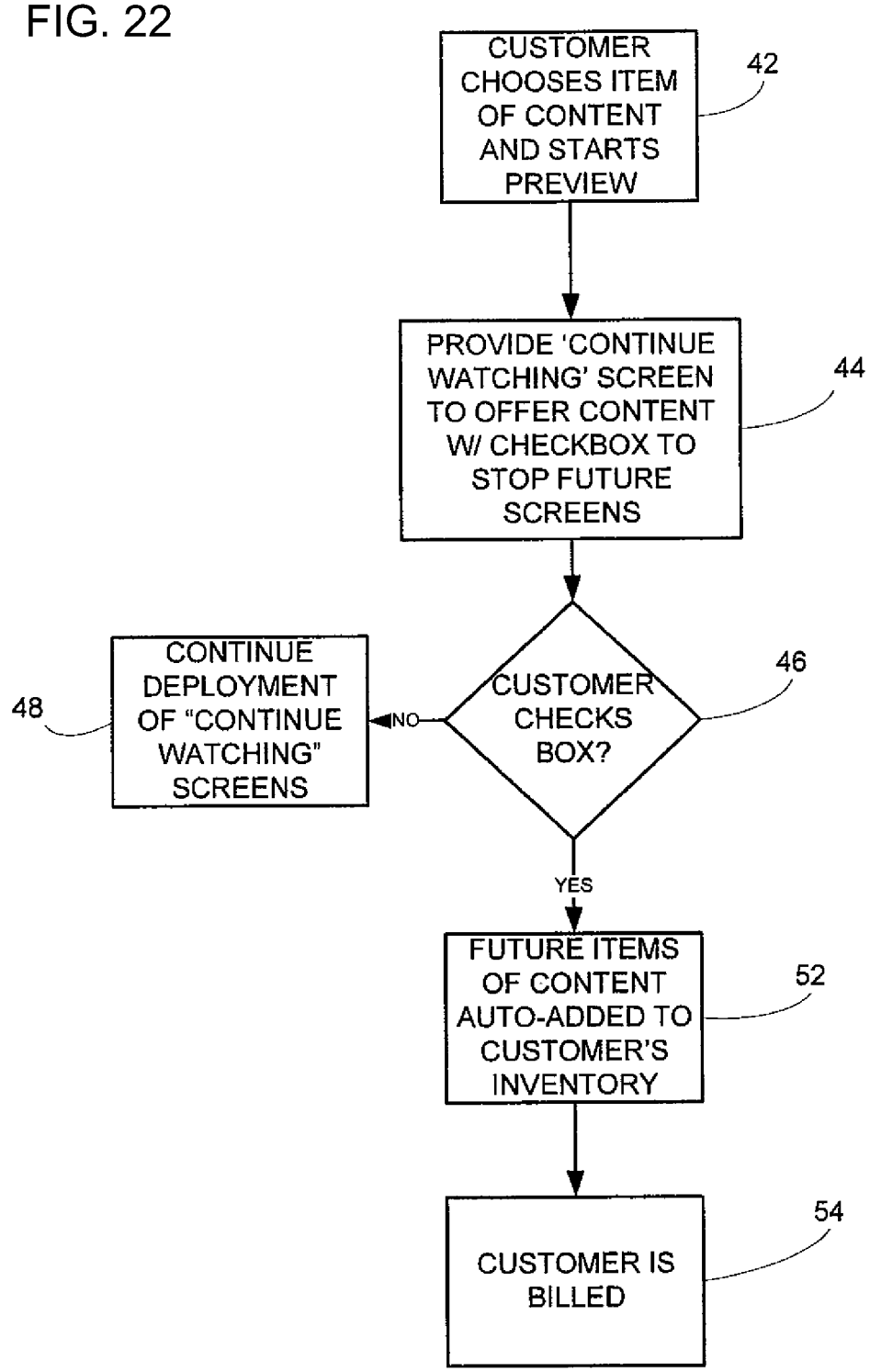
FIG. 22 is a flowchart depicting a method for one-time opt-in according to yet another embodiment.

Referring to FIG. 22, in many cases, the offer of a free trial can be made while the customer is previewing a song or video (step 42). In this case, the offer can be made as part of a "splash" screen that interrupts and appears as an overlay above the interrupted video player (step 44). The customer can then be asked to "continue watching". As part of this "continue watching" screen, a checkbox can appear (step 46) which, when checked, indicates that the customer does not wish to see such screens again. If checked (step 48), the "continue watching" screen no longer appears after previews finish playing. Instead, when the preview counts down to 00:00, an additional optional period of preview time can pass on the clock, and the video may be automatically added (step 52) and the customer billed appropriately (step 54) as described above. A visual indication of this automatic addition to the customer's home or web page, here termed an "MHP", can appear, such as "video added!", etc. This automatic addition can then continue until the customer affirmatively indicates their desire to stop such automatic additions. To implement such an embodiment, a countdown clock or countdown timer can appear as part of the preview screen. In a related embodiment, if the checkbox is checked, the user can automatically add items of content without any previews at all.

If the checkbox is not checked, then the "continue watching" screen can continue to be displayed when items of content are previewed (step 48).

In any case, the trial can be for a pre-selected amount, or an unlimited amount, of videos, music, or a combination of both. Of course, other items of content can also be purchased, such as blogs and other written or textual content. The product can be accessed in private and public view, where the former refers to what a registered and verified customer has available when they log in, and the latter refers to what anyone, not logged into mobile community platform, has access to as explained above. When the trial ends, the customer can be automatically billed when they click a button such as "Add Video" "Add Song" or "Continue." After completing One Time Opt-in the customer may never have to opt-in to video or music packages again, depending on the embodiment.

Certain embodiments can be applicable to verified customers in billable countries and non-billable countries. In the latter case, after the non-billable verified user's trial is expired, the user can still be able to enjoy the music and videos they have added to their personal mobile home page, but may not be able to purchase content unless they have an available balance in their account.

Details of how users may hold funds in their accounts is provided in a U.S. patent application Ser. No. 11/688,714, filed Mar. 20, 2007, entitled "Systems and Methods for Generation, Registration and Mobile Phone Billing of Music Pod System," which is attached here as Appendix II and incorporated herein by reference in its entirety for all purposes.

Certain details of third party audio, in particular music, content can be made available to a community of mobile phone users are described in U.S. Provisional Patent Application Ser. No. 60/784,393, filed Mar. 20, 2006, entitled "Generation of Music-Content Application Pod and Music Store with Monetized Mobile Phone Billing", which is incorporated herein by reference in its entirety for all purposes. Treatment of video content is analogous.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A computer implemented method of providing a service to a user of a social networking site, the method comprising:
   on a social network site, establishing a user area associated with each of a plurality of users;
   at the social networking site, receiving registrations of a plurality of network-enabled applications from a plurality of developers;
   by the social networking site, making the plurality of network-enabled applications available to the plurality of users via a directory on the social networking site and providing each of the plurality of users the ability to access or use the plurality of network-enabled applications through the user area associated with each user;
   at the social networking site, receiving a one-time authorization from at least a first one of the plurality of users to bill an account associated with the user;
   receiving requests from the first user for a plurality of content available through the social networking site and the user area associated with the first user;
   providing to the first user options to subscribe to a plurality of free trials of services related to the plurality of content, wherein each of the plurality of free trials are for a limited time;
   receiving selections of subscriptions to two or more of the plurality of free trials of services from the first user;
   providing the selected subscriptions to the two or more free trials to the first user for the limited times; and
   by the social networking site, automatically billing the first user for further access to each of two or more of the services after the corresponding limited time based on the one-time authorization.

2. The method of claim 1, wherein the selections of subscriptions to two or more of the plurality of free trials do not comprise selections of subscriptions to all of the plurality of free trials, and wherein the method further comprises providing to the first user options to subscribe to the unselected free trials of services at a later time.

3. The method of claim 2, further comprising:
   receiving selections of subscriptions to one or more of the previously unselected free trials of services, and,
   by the social networking site, automatically billing the first user for further access to each of the one or more previously unselected services after a corresponding limited time based on the one-time authorization.

4. The method of claim 3, wherein the one-time authorization comprises a monthly billing fee.

5. The method of claim 1, wherein providing to the first user options to subscribe to a plurality of free trials of services comprises providing at least one splash screen, the splash screen comprising an offer for at least one of the plurality of free trials.

6. The method of claim 1, further comprising providing to the first user a preview of one or more of the plurality of content, and wherein providing to the first user options to subscribe to a plurality of free trials of services comprises interrupting the preview.

7. The method of claim 6, further comprising playing the previewed content from its beginning if the first user opts to subscribe to a service related to the previewed content in response to the interruption of the preview.

8. The method of claim 6, further comprising playing the previewed content from a point of interruption if the first user opts to subscribe to a service related to the previewed content in response to the interruption of the preview.

9. The method of claim 1, further comprising verifying a user by:
delivering a code to a mobile handset used by the user to be verified to access one or more of the plurality of content; and
requesting the user to be verified to input the code into a form on a web page.

10. The method of claim 9, further comprising:
determining if the first user is a verified user;
determining if the first user is a registered user; and,
if the first user is a registered user but is not a verified user, providing to the first user an option to subscribe to a free trial of a service related to one or more of the plurality of content for a limited time if the first user has money or credit in an associated user account.

11. The method of claim 1, further comprising:
after a limited time corresponding to a first one of the selected two or more free trials and during a preview of a chosen item of content related to the first free trial, interrupting the preview after a predetermined period of time;
prompting the first user whether to continue playing the chosen item of content; and,
if the first user indicates that the chosen item of content should continue to be played, automatically billing the first user for the chosen item of content based on the one-time authorization.

12. The method of claim 11, further comprising providing a timer indicating a time remaining for the preview of the chosen item of content.

13. The method of claim 12, wherein the automatic billing occurs a predetermined period of time after the timer counts down to zero.

14. The method of claim 1, further comprising automatically billing the first user on a monthly basis.

15. The method of claim 1, further comprising billing the first user in response to a request from the first user to place requested content in the first user's user area or to access the requested content through the first user's user area.

16. A system for providing a service to a user of a social networking site, the system comprising:
at least one hardware processor; and
at least one software application that, when executed by the at least one hardware processor,
on a social networking site, establishes a user area associated with each of a plurality of users,
at the social networking site, receives registrations of a plurality of network-enabled applications from a plurality of developers,
by the social networking site, makes the plurality of network-enabled applications available to the plurality of users via a directory on the social networking site and providing each of the plurality of users the ability to access or use the plurality of network-enabled applications through the user area associated with each user,
at the social networking site, receives a one-time authorization from at least a first one of the plurality of users to bill an account associated with the user,
receives requests from the first user for a plurality of content available through the social networking site and the user area associated with the first user,
provides to the first user options to subscribe to a plurality of free trials of services related to the plurality of content, wherein each of the plurality of free trials are for a limited time,
receives selections of subscriptions to two or more of the plurality of free trials of services from the first user,
provides the selected subscriptions to the two or more free trials to the first user for the limited times, and
by the social networking site, automatically bills the first user for further access to each of two or more of the services after the corresponding limited time based on the one-time authorization.

17. The system of claim 16, wherein the at least one software application further provides to the first user a preview of one or more of the plurality of content, and wherein providing to the first user options to subscribe to a plurality of free trials of services comprises interrupting the preview.

18. The system of claim 17, wherein the at least one software application further plays the previewed content from its beginning if the first user opts to subscribe to a service related to the previewed content in response to the interruption of the preview.

19. The system of claim 17, wherein the at least one software application further plays the previewed content from a point of interruption if the first user opts to subscribe to a service related to the previewed content in response to the interruption of the preview.

20. The system of claim 16, wherein the at least one software application further:
after a limited time corresponding to a first one of the selected two or more free trials and during a preview of a chosen item of content related to the first free trial, interrupts the preview after a predetermined period of time;
prompts the first user whether to continue playing the chosen item of content; and,
if the first user indicates that the chosen item of content should continue to be played, automatically bills the first user for the chosen item of content based on the one-time authorization.

* * * * *